United States Patent
Miyabe et al.

(10) Patent No.: US 6,810,477 B1
(45) Date of Patent: Oct. 26, 2004

(54) PROGRAMMABLE CONTROLLER INCLUDING INSTRUCTION DECODER FOR JUDGING EXECUTION/NON-EXECUTION BASED ON THE STATE OF CONTACT POINTS AFTER EXECUTION OF A PRECEDING SEQUENCE PROGRAM

(75) Inventors: Kazuaki Miyabe, Tokyo (JP); Keiichi Akizuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 791 days.

(21) Appl. No.: 09/701,431

(22) Filed: Nov. 29, 2000

Related U.S. Application Data

(63) Continuation of application No. PCT/JP99/02839, filed on May 28, 1999.

(51) Int. Cl.⁷ ................................................ G06F 9/06
(52) U.S. Cl. ...................................... 712/245; 712/248
(58) Field of Search ............................... 712/245, 246, 712/247, 248, 208, 214

(56) References Cited

U.S. PATENT DOCUMENTS

| | | | | |
|---|---|---|---|---|
| 3,731,280 A | * | 5/1973 | Shevlin | 712/245 |
| 3,849,765 A | * | 11/1974 | Hamano | 712/246 |
| 4,675,843 A | * | 6/1987 | Vautier | 712/208 |
| 5,933,651 A | * | 8/1999 | Masuda et al. | 712/42 |

FOREIGN PATENT DOCUMENTS

| | | | | |
|---|---|---|---|---|
| JP | 03196204 A | * | 8/1991 | G05B/19/05 |
| JP | 10254509 A | * | 9/1998 | G05B/19/02 |

* cited by examiner

Primary Examiner—Henry W. H. Tsai
(74) Attorney, Agent, or Firm—Sughrue Mion, PLLC

(57) ABSTRACT

An instruction decode section judges execution/non-execution according to a state of a contact point of the last sequence program stored in a conductive/non-conductive information storage section under an execution condition of an instruction decoded by the instruction decode section. After a data memory control section reads arithmetic data are read from a data memory or a sequence program memory when the execution condition is established and an arithmetic section executes arithmetic, the data memory control section provides control so as to write the arithmetic result into the data memory. When the execution condition is not established, the data memory control section provides control so as not to read/write the arithmetic data between the data memory and the arithmetic section. When the execution condition is not established, the data memory control section does not execute arithmetic so as to proceed to next instruction.

10 Claims, 22 Drawing Sheets

(a)

CONTENTS OF SEQUENCE
PROGRAM MEMORY (b)

| | |
|---|---|
| a ADDRESS | LD X0 |
| a+1 ADDRESS | STMLD D0 |
| a+2 ADDRESS | STMLD D1 |
| a+3 ADDRESS | + D2 |
| a+4 ADDRESS | LD X1 |
| a+5 ADDRESS | STMLD D3 |
| a+6 ADDRESS | INC D3 |

FIG.5

(a) SEQUENCE PROGRAM MEMORY

| | EXECUTION FLAG | H/W SPECIFICATION | DATA LENGTH | PULSE SPECIFICATION | INSTRUCTION TYPE | BIT SPECIFICATION | ADDRESS SPECIFICATION OF DATA MEMORY |
|---|---|---|---|---|---|---|---|
| a ADDRESS | 0 | H/W INSTRUCTION | BIT | ALWAYS ARITHMETIC | LD INSTRUCTION | 0 BIT | b ADDRESS |
| a+1 ADDRESS | 0 | H/W INSTRUCTION | WORD | ALWAYS ARITHMETIC | STMLD INSTRUCTION | | c ADDRESS |
| a+2 ADDRESS | 0 | H/W INSTRUCTION | WORD | ALWAYS ARITHMETIC | STMLD INSTRUCTION | | d ADDRESS |
| a+3 ADDRESS | 0 | H/W INSTRUCTION | WORD | ALWAYS ARITHMETIC | + INSTRUCTION | | e ADDRESS |
| | | | | | | | |
| a+n ADDRESS | 0 | H/W INSTRUCTION | DOUBLE WORD | ALWAYS ARITHMETIC | + INSTRUCTION | | f ADDRESS |

(b) DATA MEMORY

| | | |
|---|---|---|
| b ADDRESS | XF / X3 X2 X1 X0 | BIT DATA |
| c ADDRESS | D0 | WORD DATA |
| d ADDRESS | D1 | |
| e ADDRESS | D2 | |
| f ADDRESS | D100 | DOUBLE WORD DATA |
| f+1 ADDRESS | D101 | |

(a)

(b)

|  | CONTENTS OF SEQUENCE PROGRAM MEMORY |
|---|---|
| a ADDRESS | LD X0 |
| a+1 ADDRESS | STMLD D0 |
| a+2 ADDRESS | STMLD D1 |
| a+3 ADDRESS | +P D2 |
| a+4 ADDRESS | LD X1 |
| a+5 ADDRESS | STMLD D3 |
| a+6 ADDRESS | INCP D3 |

FIG.11
(a) 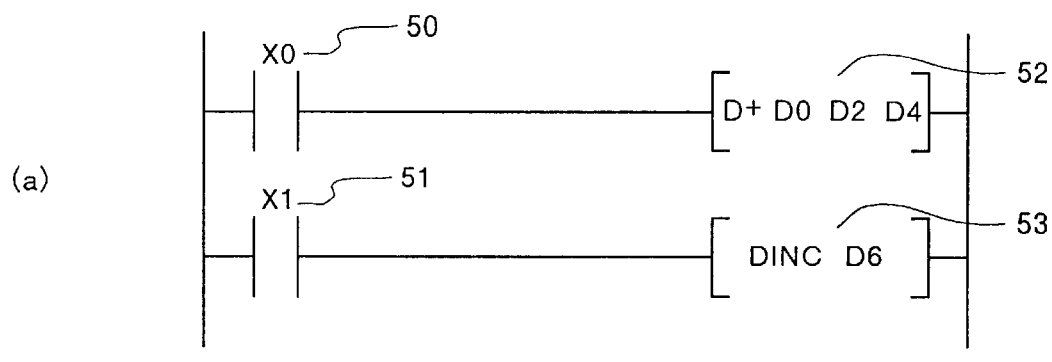
(b) 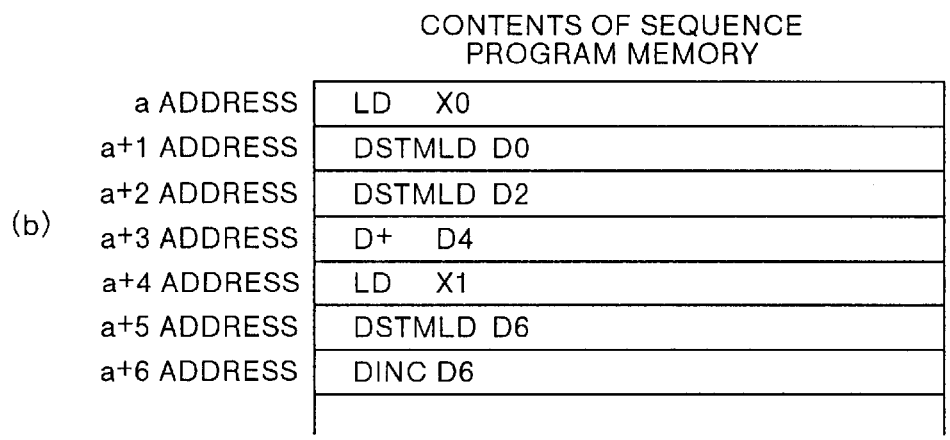

FIG.14
(a) 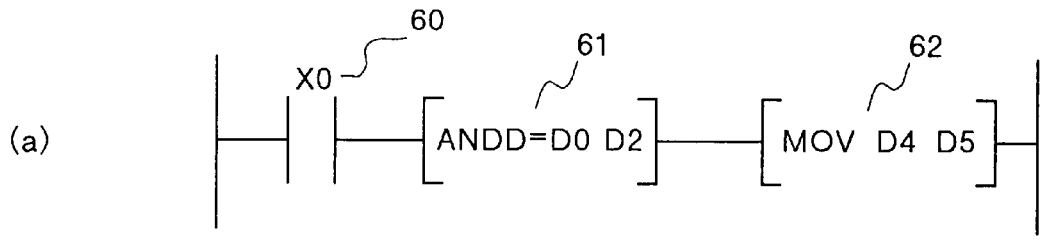
(b)
CONTENTS OF SEQUENCE PROGRAM MEMORY
| | |
|---|---|
| a ADDRESS | LD X0 |
| a+1 ADDRESS | DSTMLD D0 |
| a+2 ADDRESS | DSTMLD D2 |
| a+3 ADDRESS | ANDD= |
| a+4 ADDRESS | MLD D4 |
| a+5 ADDRESS | MOUT D5 |
(c) 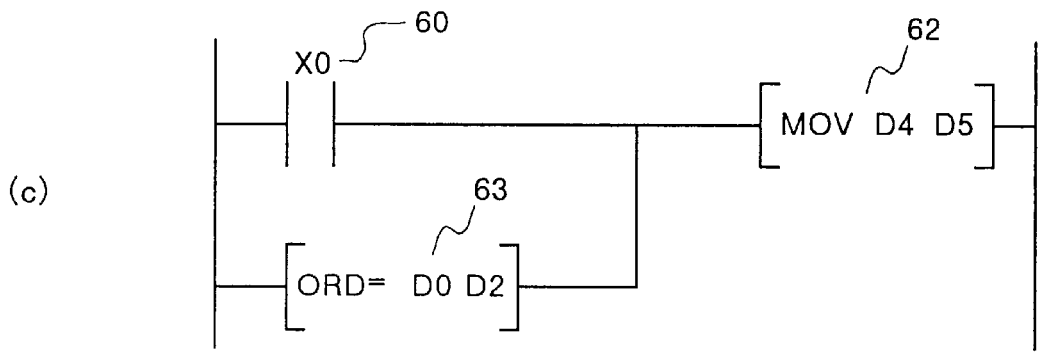

FIG.18
(a)
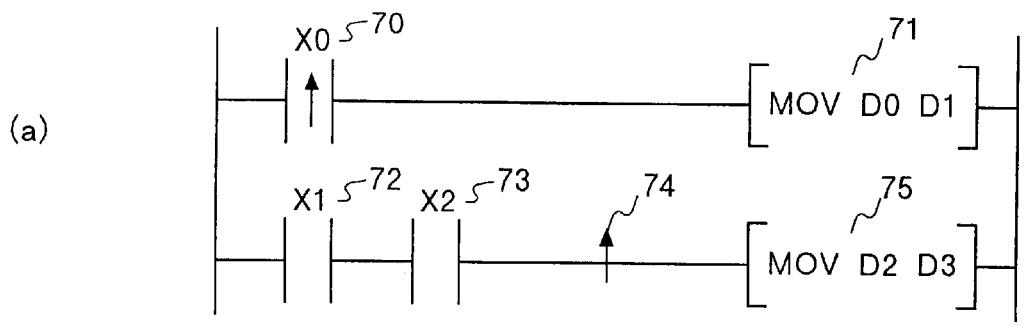
(b)
| | CONTENTS OF SEQUENCE PROGRAM MEMORY |
|---|---|
| a ADDRESS | LDP X0 |
| a+1 ADDRESS | MLD D0 |
| a+2 ADDRESS | MOUT D1 |
| a+3 ADDRESS | LD X1 |
| a+4 ADDRESS | AND X2 |
| a+5 ADDRESS | MEP |
| a+6 ADDRESS | MLD D2 |
| a+7 ADDRESS | MOUT D3 |
(c)
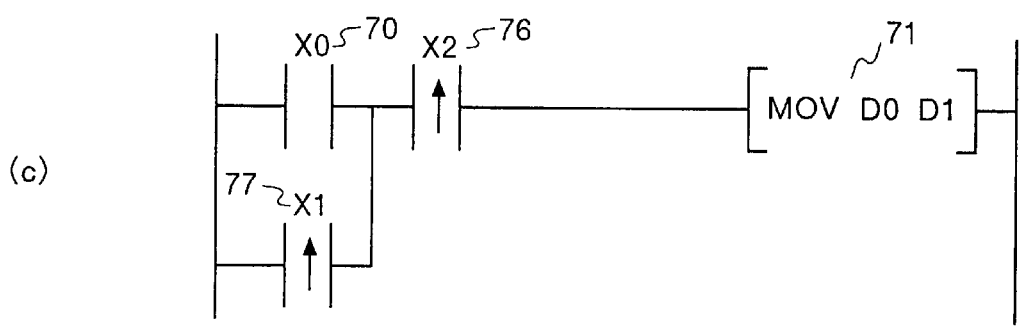

PROGRAMMABLE CONTROLLER INCLUDING INSTRUCTION DECODER FOR JUDGING EXECUTION/NON-EXECUTION BASED ON THE STATE OF CONTACT POINTS AFTER EXECUTION OF A PRECEDING SEQUENCE PROGRAM

This is a Continuation of PCT Application No. PCT/JP99/02839 filed May 28, 1999, the disclosure of which is incorporated herein by reference.

TECHNICAL FIELD

The present invention relates to a programmable controller. More specifically, this invention relates to an arithmetic circuit which processes a sequence program with high speed in a programmable controller.

BACKGROUND ART

A conventional programmable controller will be explained with reference to FIG. 21. FIG. 21 shows a structure of the programmable controller disclosed in Japanese Patent Laid-open Publication No. HEI 5-204416. This programmable controller has a sequence program memory 100 which stores a sequence program therein, an arithmetic circuit 101 for the sequence program, a data memory 102 which stores arithmetic data therein, and a microprocessor 103 which processes an instruction which cannot be executed in the arithmetic circuit 101.

The arithmetic circuit 101 has an instruction decode section 104, a conductive/non-conductive information storage section 105, an arithmetic data storage section 106, an arithmetic section 107, an address generation section 108 and a control section 109. The instruction decode section 104 decodes instruction codes of the sequence program stored in the sequence program memory 100. The conductive/non-conductive information storage section 105 stores a state of a contact point of the last sequence program. The arithmetic data storage section 106 temporarily stores data to be operated. The arithmetic section 107 executes a bit process and a word process 11 according to contents of the instruction codes. The address generation section 108 generates an address for the data memory 102. The control section 109 make controls when the arithmetic data are read from the data memory 102 into the arithmetic circuit 101 and an arithmetic result of the arithmetic section 107 is written into the data memory 102 and the 1.15 conductive/non-conductive information storage section 105.

Operation of the arithmetic circuit 101 will now be explained. When an instruction which can be processed in the arithmetic circuit 101 is executed, and if the instruction decode section 104 recognizes that data read from the sequence program memory 100 are the instruction which can be processed in the arithmetic circuit 101, the arithmetic section 107 executes an arithmetic process according to the decoded content, and the arithmetic result is stored in the conductive/non-conductive information storage section 105 or the data memory 102. The data to be operated at this time include the data read from the data memory 102 into the arithmetic data storage section 106, the data stored in the conductive/non-conductive information storage section 105 and the data stored in respective registers in the arithmetic circuit 101. When the arithmetic result is stored in the conductive/non-conductive storage section 105, the data in the data memory 102 are held as conductive/non-conductive information, and the next instruction uses the conductive/non-conductive information. Meanwhile, when the arithmetic result is stored in the data memory 102, when the conductive/non-conductive information becomes conductive, the arithmetic result in the arithmetic section 107 is held in the data memory 102.

Operation, when an instruction which cannot be executed in the arithmetic circuit 101, will now be explained. When the instruction decode section 104 recognizes the instruction which cannot be processed in the arithmetic circuit 101, the instruction decode section 104 actuates the microprocessor 103. When the microprocessor 103 is actuated, the microprocessor 103 reads the arithmetic data from the data memory 102 and executes arithmetic, and writes the arithmetic result into the conductive/non-conductive information storage section 105 or the data memory 102. Moreover, as for an instruction which is operated after judging as to whether or not it is executed at the last scanning, or an instruction which is operated after judging a state of an applicable bit in the data memory 102 at the last execution, the last execution/non-execution information is stored in an applicable bit in the sequence program, for example, and the process of the instruction is completed.

Operation of the conventional programmable controller when it executes the sequence program concretely shown in FIG. 22 will now be explained. In FIG. 22, 110 is an instruction (symbol) for storing a state of bit data X0 stored in the data memory 102 into the conductive/non-conductive information storage section 105. 111 is an instruction (symbol) for storing AND of a state of bit data X1 stored in the data memory 102 and conductive/non-conductive information about a contact point stored in the conductive/non-conductive information storage section 105 by an instruction 110 into the conductive/non-conductive information storage section 105. 112 is an instruction (symbol) for obtaining AND of a compared result of the work data D0 and D1 stored in the data memory 102 and the conductive/non-conductive information stored by the instruction 110 so as to store the AND into the conductive/non-conductive information storage section 105. 113 is an instruction (symbol) for transmitting word data D2 stored in the data memory 102 as a content of D3 when the last data in the conductive/non-conductive information storage section 105 are ON and not transmitting D2 when the last data are OFF. 114 is an instruction (symbol) for storing an added result of word data D4 and D5 stored in the data memory 102 as a content of D6 when the last data in the conductive/non-conductive information storage section 105 are ON, and not storing the added result when the last data are OFF.

Instructions 110 to 114 shown in FIG. 22 are stored in the sequence program memory 100 as instruction codes in order, and they are read into the instruction decode section 104 in order. When the instruction 110 is fetched, the control section 109 reads an input device stored in the data memory 102 into the arithmetic data storage section 106, and the arithmetic section 107 bit-extracts an ON/OFF state of X0 and stores it into the conductive/non-conductive information storage section 105.

When the instruction 111 is fetched, the control section 109 reads an input device stored in the data memory 102 into the arithmetic data storage section 106, and the arithmetic section 107 bit-extracts the ON/OFF state of X0 so as to store AND of the bit-extracted result and data in the conductive/non-conductive information storage section 105 as conductive/non-conductive information.

When the instruction 112 is fetched, the instruction decode section 104 discriminates that the instruction 112 cannot be executed in the arithmetic section 107. The microprocessor 103 is actuated so as to obtain AND of the compared result of the word data D0 and D1 stored in the data memory 102 and the conductive/non-conductive information stored by the instruction 111 and store the AND into the conductive/non-conductive information storage section 105. When the instruction 113 is fetched, the control section 109 reads D2 and D3 from the data memory 102, and writes the content of D2 into D3 when the conductive/non-conductive information is ON and writes the read content of D3 directly into D3 when the conductive/non-conductive information is OFF.

When the instruction 114 is fetched, the instruction decode section 104 recognizes that the instruction 114 cannot be executed in the arithmetic circuit 101. The microprocessor 103 is actuated so as to add D4 and D5 when the conductive/non-conductive information is ON and write the added result into D6, and so as not to add D4 and D5 when the conductive/non-conductive information is OFF.

In the conventional programmable controller, since the instructions are always discriminated regardless of the state of the conductive/non-conductive information, the instruction processing cycle becomes uniform regardless of execution/non-execution. For this reason, there arises a problem that time for processing the sequence program at the time of non-execution cannot be shortened.

In addition, in the conventional programmable controller, when the data arithmetic for double word is executed, an upper address cannot be created for the data memory 102. For this reason, the data arithmetic for double word should be executed in the microprocessor 103 as an instruction which cannot be executed in the arithmetic circuit 101. As a result, there arises a problem that the time for processing the instruction becomes longer.

In addition, in the conventional programmable controller, since means for writing as to whether or not an instruction is executed at the last scanning is not provided, an instruction which uses execution/non-execution information at the last scanning should be inevitably executed in the microprocessor 103. As a result, there arises a problem that the time for processing the instruction becomes longer.

Therefore, it is an object of the present invention to provide a programmable controller which enables shortening of the time for processing a sequence program at the time of non-execution, enables data arithmetic for double word in an arithmetic circuit and an instruction process using execution/non-execution information at the last scanning, and processes the sequence program with high speed.

DISCLOSURE OF THE INVENTION

The present invention can provide a programmable controller having a sequence program memory for storing a sequence program, a data memory for storing arithmetic data, an instruction decode section for analyzing instruction codes of the sequence program memory, a conductive/non-conductive information storage section for storing a state of a contact point of the last sequence program, an arithmetic data storage section for temporarily storing the arithmetic data read from the data memory, a control section for controlling reading/writing for the data memory and controlling the arithmetic data storage section, and an arithmetic section composed of hardware for executing arithmetic according to contents of the instruction codes, that the instruction decode section judges execution/non-execution according to a state of the contact point of the last sequence program stored in the conductive/non-conductive information storage section under an execution condition of an instruction decoded by the instruction decode section, a data memory control section is provided to the control section, and the data memory control section reads arithmetic data from the data memory or the sequence program memory when the execution condition is established and after arithmetic in the arithmetic section, provides control so as to write an arithmetic result into the data memory, and provides control so as not to read/write the arithmetic data between the data memory and said arithmetic section when the execution condition is not established, and does not execute arithmetic when the execution condition is not established so as to proceed to next instruction. Therefore, since the instruction decode section judges execution/non-execution according to the conductive/non-conductive information of the contact point, and the arithmetic data between the data memory and the arithmetic section are not read/written nor operated at the time of non-execution, the processing time at the time of non-execution can be shortened.

In addition, the present invention can provide a programmable controller having a sequence program memory for storing a sequence program, a data memory for storing arithmetic data, an instruction decode section for analyzing instruction codes of the sequence program memory, a conductive/non-conductive information storage section for storing a state of a contact point of the last sequence program, an arithmetic data storage section for temporarily storing arithmetic data read from the data memory, a control section for controlling reading/writing for the data memory and controlling the arithmetic data storage section, an arithmetic section composed of hardware for executing arithmetic according to contents of the instruction codes, that a bit (execution flag bit) for storing existence/non-existence of an instruction at the last scanning is provided in the sequence program memory, the instruction decode section judges execution/non-execution according to a state of the contact point of the last sequence program stored in the conductive/non-conductive information storage section and on/off state of the bit in the sequence program memory under an execution condition of an instruction decoded by the instruction decode section, a data memory control section is provided to the control section, and the data memory control section reads the arithmetic data from the data memory or the sequence program memory when the execution condition is established and after arithmetic in the arithmetic section, provides control so as to write an arithmetic result into the data memory, and provides control so as not to read/write the arithmetic data between the data memory and said arithmetic section when the execution condition is not established, and does not execute arithmetic when the execution condition is not established so as to proceed to next instruction. Therefore, since the instruction decode section judges execution/non-execution according to the conductive/non-conductive information of the contact point and the execution flag bit, and the arithmetic data between the data memory and the arithmetic section are not read/written nor operated at the time of non-execution, the processing time at the time of non-execution can be shortened.

In addition, the present invention can provide a programmable controller, that data of the conductive/non-conductive information storage section are written into the bit in the sequence program memory into which execution/non-execution of an instruction at the last scanning is stored. Therefore, when the conductive/non-conductive information is written into the applicable bit in the sequence program memory so as to be capable of being used for the execution flag at the next scanning, an instruction for executing only scanning that the contact point is on can be processed by the arithmetic section composed of hardware with high speed. As a result, the arithmetic process can be sped up.

In addition, the present invention provides a programmable controller including: an address holding unit for latching an address of the data memory to be accessed in the data memory; and an address generation control unit for incrementing an address latched by the address holding unit so as to generate an address for the data memory when the instruction decode section recognizes instruction codes for executing double word arithmetic, and the execution condition is established and high-order word data are read/written, the address holding unit and the address generation control unit reading/writing the double word data into the data memory. Therefore, the instruction of double word can be processed by the arithmetic section composed of hardware with high speed, and the arithmetic process can be sped up.

In addition, the present invention provides a programmable controller that the arithmetic section has a comparator, when the execution condition is established, after the data memory control section reads the arithmetic data from the data memory or the sequence program memory and the comparator in the arithmetic section execute comparison arithmetic, the data memory control section provides control so as to write the arithmetic result into said data memory, and when the execution condition is not established, the data memory control section provides control so as not to read/write the arithmetic data between the data memory and the arithmetic section, and when the execution condition is not established, the data memory control section does not execute the comparison arithmetic by means of the comparator of the arithmetic section so as to proceed to next instruction. Therefore, in an instruction for storing the arithmetic result into the conductive/non-conductive information storage section, before the comparison arithmetic is executed under the execution condition of the instruction, the execution/non-execution is judged. Since in the case of non-execution of the instruction, the comparison arithmetic is not executed, the processing time at the time of non-execution can be shortened.

In addition, the present invention provides a programmable controller that instruction codes, which are composed of a combination of an instruction for reading the arithmetic data from the data memory or an instruction for reading contents of the sequence program memory and an instruction showing arithmetic, are stored in the sequence program memory, the arithmetic data storage section has a data storage-use register for storing the arithmetic data read from the data memory and a stack pointer showing a register address in which the arithmetic data are stored, the control section has a stack pointer control section which stores the arithmetic data into the data storage-use register and increments the stack pointer when the instruction for reading the arithmetic data or the instruction for reading the contents of the sequence program memory is executed, and decrements the stack pointer when the instruction showing arithmetic is executed so as to read the data from the data storage-use register, and initializes the stack pointer at the time of processing the instruction showing arithmetic when the execution condition is not established. Therefore, when the execution condition is not established, only the stack pointer is initialized at the time of processing the instruction showing the arithmetic. As a result, the processing time can be shortened.

In addition, the present invention provides a programmable controller that a bit (execution flag bit) for storing execution/non-execution of an instruction at the last scanning is provided in the sequence program memory for storing the sequence program, logical arithmetic between on/off state of a bit read from the data memory and on/off state of the bit into which execution/non-execution of the instruction at the last scanning is stored is executed, and the arithmetic result is written into the conductive/non-conductive information storage section. Therefore, since the states of bit devices at the last scanning are written into the execution flag bit of the sequence program memory, the instruction for executing only scanning that the bit devices change can be processed by the arithmetic section composed of hardware with high speed. As a result, the arithmetic process can be sped up.

In addition, the present invention provides a programmable controller that the on/off state of the bit read from said data memory is stored into the bit (execution flag bit) in the sequence program memory into which execution/non-execution of the instruction at the last scanning. Therefore, the on/off state of the bit read from the data memory is written into the bit (execution flag bit) in the sequence program memory into which execution/non-execution of the instruction at the last scanning is stored. The instruction for executing only scanning that the bit device changes can be processed by the arithmetic section composed of hardware with high speed. As a result, the arithmetic process can be sped up.

In addition, the present invention provides a programmable controller that a bit for storing execution/non-execution of an instruction at the last scanning is provided in the sequence program memory into which the sequence program is stored, logic arithmetic between on/off state of the contact point of the last sequence program stored in the conductive/non-conductive information storage section and on/off state of a bit into which execution/non-execution of an instruction at the last scanning is stored is executed, and the arithmetic result is written into the conductive/non-conductive information storage section. Therefore, since the conductive/non-conductive information is written into the applicable bit in the sequence program memory so as to be capable of being used for the execution flag bit at the next scanning, the instruction for executing only scanning the contact point is on can be processed by the arithmetic section composed of hardware with high speed. As a result, arithmetic process can be sped up.

In addition, the present invention provides a programmable controller including a register for saving data of the conductive/non-conductive information storage section, the data saved in the register being written into the bit in the sequence program memory into which execution/non-execution of the instruction at the last scanning is stored. Therefore, the conductive/non-conductive information saved in the register can be written into the bit in the sequence program memory into which execution/non-execution of the instruction at the last scanning is stored. The instruction for executing only scanning that the contact point is on can be processed by the arithmetic section composed of hardware with high speed. As a result, the arithmetic process can be sped up.

BRIEF DESCRIPTION OF THE DRAWINGS

FIGS. 5(a) and 5(b) are explanatory diagrams showing a relationship between a sequence program memory and a data memory;

FIGS. 11(a) and 11(b) are a ladder circuit diagram and an instruction code list diagram showing another operation of the programmable controller of the present invention;

FIGS. 14(a), 14(b) and 14(c) are ladder circuit diagrams and an instruction code list diagram showing another operation of the programmable controller of the present invention;

FIGS. 18(a) to 18(c) are ladder circuit diagrams and an instruction code list diagram showing another operation of the programmable controller of the present invention;

BEST MODE FOR CARRYING OUT THE INVENTION

Present invention will be explained below with reference to the attached drawings.

Figure 1:
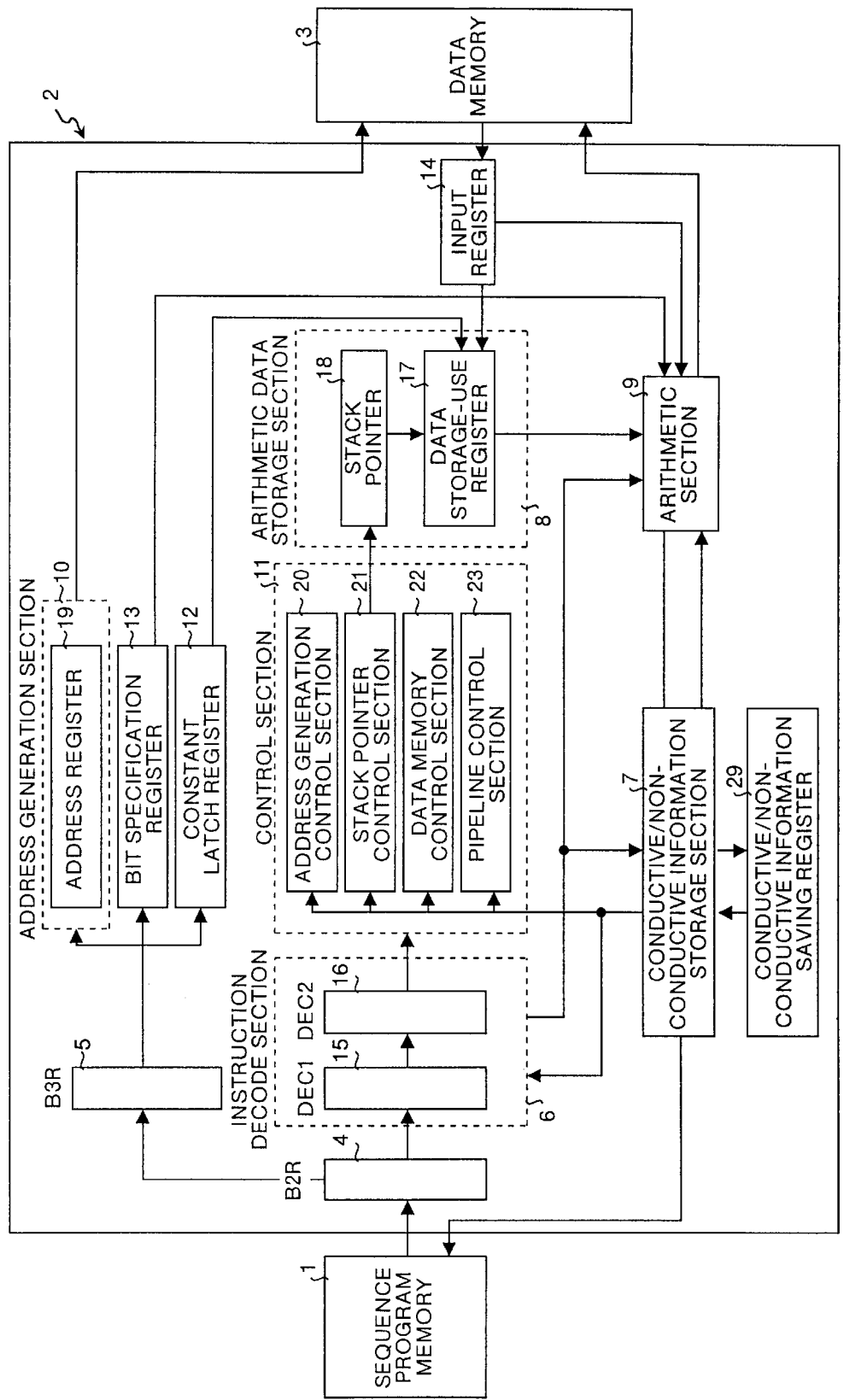
FIG. 1 is a block diagram showing a structure of a programmable controller of the present invention.

FIG. 1 shows a programmable controller of the present invention. This programmable controller has a sequence program memory 1 for storing instruction codes of a sequence program, an arithmetic circuit 2 for a sequence program, and a data memory 3 for storing arithmetic data.

A bit (execution flag bit) for storing execution/non-execution of an instruction at the last scanning is provided in the sequence program memory 1. The arithmetic circuit 2 for a sequence program has a pipeline register (hereinafter, B2R register) 4, a pipeline register (hereinafter, B3R register) 5, an instruction decode section 6, a conductive/non-conductive information storage section 7, an arithmetic data storage section 8, an arithmetic section 9 composed of hardware, an address generation section 10, a control section 11, a constant latch register 12, a bit specification register 13 and an input register 14. The B2R register 4 reads contents stored in the sequence program memory 1 in order starting from the zero-th address. The B3R register 5 reads the contents of the B2R register 4. The instruction decode section 6 decodes the contents of the B2R register 2. The conductive/non-conductive information storage section 7 stores a state of a contact point of the last sequence program. The arithmetic data storage section 8 temporarily stores data to be operated. The arithmetic section 9 executes a bit process and a word process (arithmetic operation, logic operation, transmission) according to contents of instruction codes. The address generation section 10 generates an address for the data memory 3. The control section 11 provides control when arithmetic data are read from the data memory 3 into the arithmetic circuit 2 and the arithmetic result of the arithmetic section 9 is written into the data memory 3 or the conductive/non-conductive information storage section 7. The constant latch register 12 latches constant data when the constant data are treated. The bit specification register 13 latches bit specification data when the bit arithmetic is executed. The input register 14 latches the arithmetic data read from the data memory 3.

The instruction decode section 6 includes a pipeline register (hereinafter, DEC1 register) 15 for holding decoded contents and a pipeline register (hereinafter, DEC2 register) 16 for holding the contents of the DEC1 register 15. The instruction decode section 6 judges a state of a contact point of the last sequence program stored in the conductive/non-conductive information storage section 7 or the state of the contact point of the last sequence program stored in the conductive/non-conductive information storage section 7 and an ON/OFF state of the execution flag bit in the sequence program memory 1 as to execution/non-execution using an execution condition of the instruction decoded by the instruction decode section 6.

The arithmetic data storage section 8 includes a data storage-use register 17 for storing arithmetic data read from the data memory 3, and a stack pointer 18 for representing a register address where the arithmetic data in the data storage-use register 17 are stored. The address generation section 10 includes an address register (address holding unit) 19 where an address for the data memory 3 is stored when double word instruction is operated.

When the instruction decode section 6 recognizes an instruction code for operating the double word and the execution condition is established so that high-order data are read/written, the address register 19 increments an address latched in the address register 19 so as to generate an address for the data memory 3.

The control section 11 includes an address generation control section 20, a stack pointer control section 21, a data memory control section 22 and a pipeline control section 23. The address generation control section 20 controls the address generation section 10 for generating an address for the data memory 3. The stack pointer control section 21 controls the stack pointer 18 provided to the arithmetic data storage section 8. The data memory control section 22 controls reading/writing in the data memory 3. The pipeline control section 23 controls the pipeline registers.

When an instruction for reading the arithmetic data or an instruction for reading contents of the sequence program memory is executed, the stack pointer control section 21 stores the arithmetic data into the data storage-use register 17 and increments the stack pointer 18 so as to execute an instruction showing arithmetic. Thereafter, when the stack pointer control section 21 decrements the stack pointer 18 and reads the data from the data storage-use register 17. When an execution condition is not established, the stack pointer control section 21 initializes the stack pointer 18 at the time of processing the instruction showing arithmetic.

The data memory control section 22 controls reading/writing of the data memory 3 according to establishment/non-establishment of the instruction execution condition. The pipeline control section 23 generates a wait signal which stops the pipeline operation of the sequence program memory 1 when an instruction execution cycle becomes two and more.

A conductive/non-conductive information saving register 29 is constituted so as to write saved data into a bit where execution/non-execution of the instruction at the last scanning in the sequence program memory 1 is stored.

FIGS. 2(a) and 2(b) show a ladder circuit and contents of instruction codes (example 1) of the sequence program. In FIGS. 2(a), 30 and 31 are instructions (symbols) for reading states of X0 device and X1 device stored in the data memory 3 so as to store the states into the conductive/non-conductive information storage section 7. 32 is an instruction (symbol) for adding word data D0 and D1 when the conductive/non-conductive information storage section 7 is in 1 (ON) state so as to store the arithmetic result into D2. 33 is an instruction (symbol) for adding 1 to word data D3 so as to store the arithmetic result into D3.

As shown in FIG. 2(b), the instruction codes of the instruction 32 are stored in a+1 address to a+3 address of the sequence program memory 1. The instruction codes of the instruction 32 are composed of instructions in a+1 and a+2 addresses for reading data from the data memory 3 into the data storage-use register 17, and an instruction in the a+3 address showing the arithmetic contents. Similarly, the instruction codes of the instruction 33 are stored in a+5 to a+6 addresses of the sequence program memory 1. The instruction codes of the instruction 33 are composed of an instruction in an a+5 address for reading data from the data memory 3 into the data storage-use register, and an instruction in the a+6 address showing the arithmetic contents.

Figure 2:
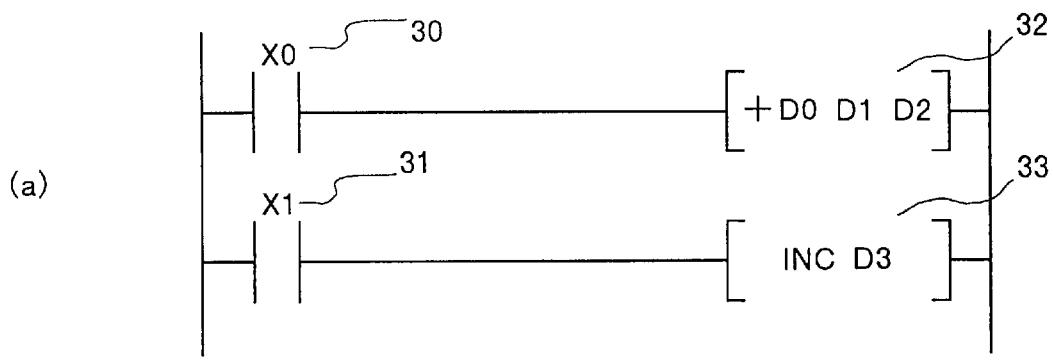
FIGS. 2(a) and 2(b) are a ladder circuit diagram and an instruction code list diagram showing an operation of the programmable controller of the present invention.
Figure 3:
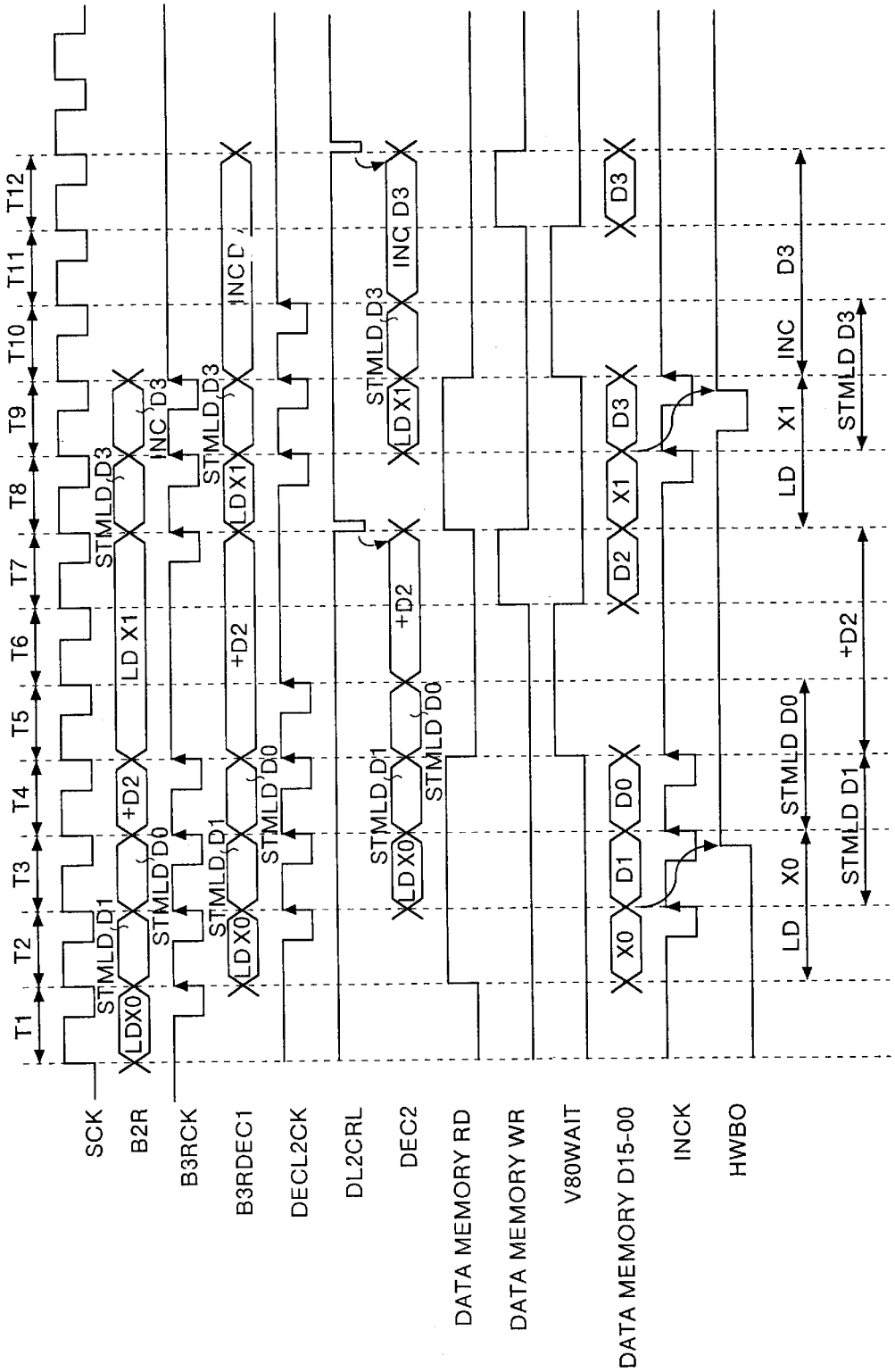
FIG. 3 is a timing chart when the ladder circuit shown in FIG. 2(a) is operated.
Figure 4:
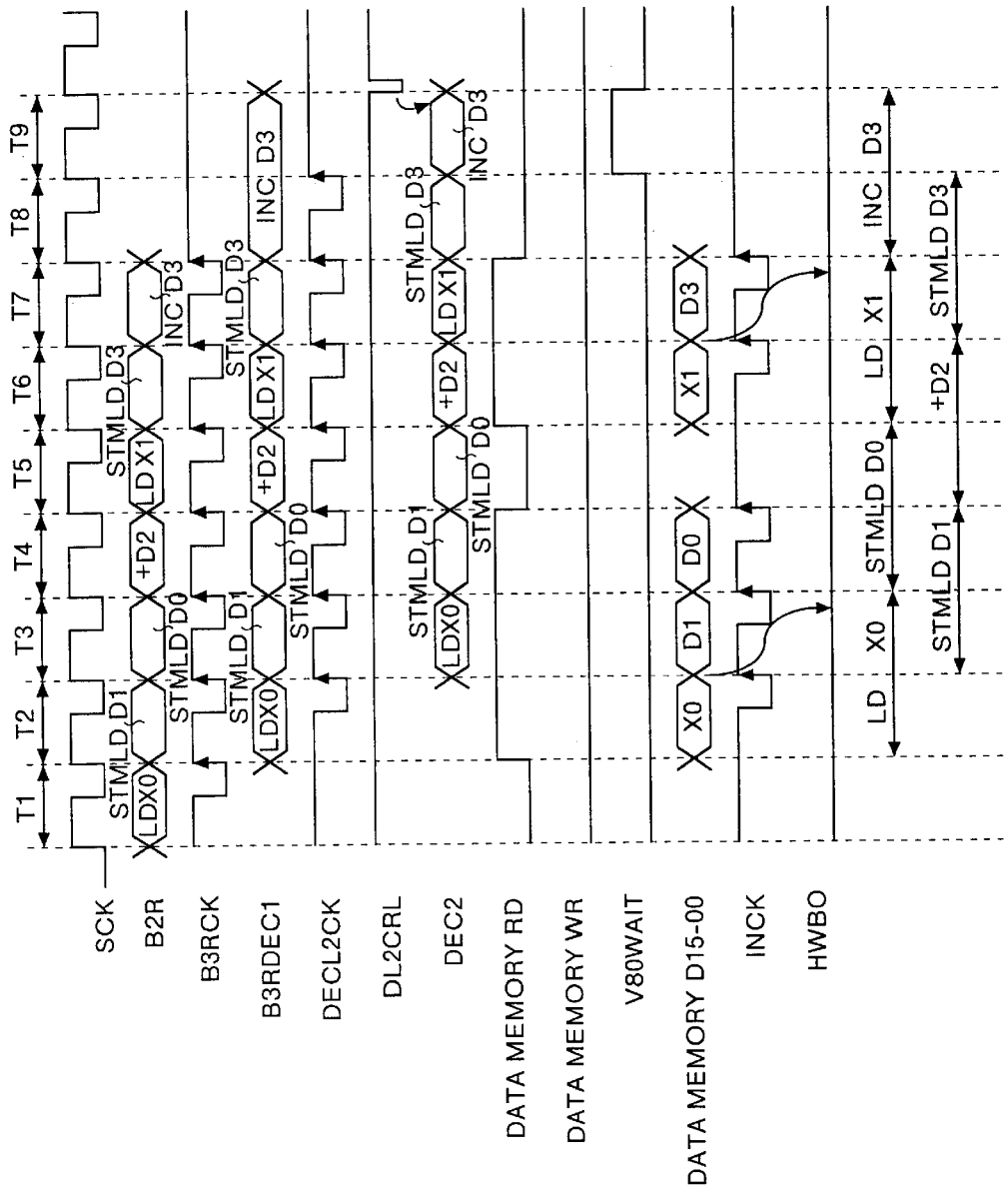
FIG. 4 is a timing chart when the ladder circuit shown in FIG. 2(a) is not operated.

FIG. 3 is a timing chart showing an operation of the ladder circuit of the example 1 shown in FIG. 2 which is operated by the arithmetic circuit 2 shown in FIG. 1 when the instructions 32 and 33 are executed. FIG. 4 is a timing chart showing an operation when the instructions 32 and 33 are not executed.

In FIGS. 3 and 4, SCK is a reference clock, B3RCK is a latch clock of the B3R register 5 and DEC1 register 15, DECL2CK is a latch clock of the DEC2 register 16, DL2CRL is a clock which initializes the DEC2 register 16, and INCK is a clock which latches the contents of the data memory 3 in the input register 14. Moreover, V80WAIT is a wait signal which stops the pipeline operation of the sequence program memory 1 when the instruction executing cycle becomes two or more.

FIGS. 5(a) and 5(b) show a relationship of the data stored in the sequence program memory 1 and in the data memory 3. In FIG. 5(a), the instruction codes, which are stored in the a to a+3 addresses of the sequence program memory 1, are examples of the instructions 30 and 32 in FIG. 2.

The instruction codes are composed of data which include address specification information of the data memory 3 where the arithmetic data are stored, bit specification information where a bit number to be used for the arithmetic in the case of the bit arithmetic is stored, types of the instructions, a pulse specification section where as to where or not an instruction to be executed is pulse arithmetic is stored, a length of data to be treated by the instruction, an H/W specification section where as to whether or not the instruction can be H/W processed is stored, and an execution flag bit where as to whether or not the instruction is executed at the last scanning is stored. 0 as default is stored in the execution flag bit.

Data which are treated by the instruction are stored in each of the addresses stored in address specification section in the sequence program memory 1. Moreover, as shown in the example of the a+n address, in the arithmetic of double word, the data are stored in an address (f address) stored in the address specification section in the sequence program memory 1 and an address (f+1 address) where 1 is added to the f address.

There will be explained below an operation by the sequence program of the example 1. The description will be given as to an operation of an LD instruction shown in the instruction 30. A period T1 shows that the instruction codes of the LD instruction stored in the a address in the sequence program memory 1 have been latched by the B2R register 4. H/W (hardware) instruction is recognized at the period T1, and the type of the instruction, execution/non-execution of reading/writing into the data memory 3, and a number of wait required for the arithmetic are outputted as decode signal.

For period T2 at B3RCK latch clock, contents of the B2R register 4 are stored into the B3R register 5 and the contents decoded for period T1 are latched in the DEC1 register 15, and word data are read from the address of the data memory 3 stored in the B3R register 5 into the input register 14. At this time, a read signal for the data memory 3 is generated in the data memory control section 22 from the contents latched in the DEC1 register 15.

For period T3 a bit which is specified by the bit specification register 13 (the register which latches bit specification information in the instruction codes shown in FIG. 5) is extracted from the word data latched in the input register 14 so as to be latched as data of conductive/non-conductive information (hereinafter, occasionally referred to as HWBO).

There will be explained below the operations of the instructions 32 and 33 in the case where 1 is stored in HWBO by LD instruction with reference to FIG. 3. The operation of STMLD instruction will be explained below using STMLD instruction stored in the a+1 address. When the STMLD instruction is stored in the B2R register 4 (period T2 in FIG. 3), the instruction decode section 6 recognizes the STMLD instruction as H/W instruction, and outputs a type of the instruction, existence/non-existence of reading/writing into the data memory 3 and a number of wait required for the arithmetic as decode signal.

For period T3 similarly to the LD instruction, at latch clock B3RCK the contents of the B2R register 4 are stored in the B3R register 5, and the contents decoded at period T2 are latched in the DEC1 register 15. Thereafter, arithmetic data are read from the address of the data memory 3 stored in the B3R register 5 into the input register 14.

For period T4 the contents of the input register 14 are stored in the data storage-use register 17 shown by the stack pointer 18, and the stack pointer control section 21 increments a value of the stack pointer 18. At this time, the arithmetic section 9 and the conductive/non-conductive information storage section 7 are not operated.

The STMLD instruction stored in the a+2 address also performs the same operation, but since the stack pointer 18 is incremented by the STMLD instruction stored in the a+1 address, data are stored in different data storage-use register 17.

There will be explained below the operation of the +instruction. When the + instruction is stored in the B2R register 4 (period T4 in FIG. 3), the instruction decode section 6 recognizes the + instruction as H/W instruction, and outputs a type of the instruction, existence/non-existence of reading/writing to the data memory 3 and a number of wait required for the operation as decode signal. In the case of the + instruction, since adding data and data to be added are read from the data memory 3, the STMLD instruction is surely required twice. When the + instruction is stored in the B2R register 4, HWBO (conductive/non-conductive information) is surely defined.

For this reason, since in the case of HWBO=1, the arithmetic is executed, the instruction decode section 6 decodes the + instruction as 2 wait instruction. On the contrary, since in the case of HWBO=0, the arithmetic is not executed, the instruction decode section 6 decodes + instruction as 0 wait instruction.

For period T5 since the adding data and the data to be added are not yet stored in the data storage-use register 17, the arithmetic is not executed, the pipeline control section 23 outputs only the wait signal so as to stop the pipeline operation.

For period T6 the adding data and the data to be added stored in the data storage-use register 17 are read into the register of the arithmetic section 9 by the read signal generated by the data memory control section 22. Addition is executed (arithmetic is executed) by an adder in the arithmetic section 9.

For period T7 the added result is written into the data memory 3. At this time, as for the address for writing, the added result is written into a data memory address stored in the B3R register 5, and a write signal is generated in the data memory control section 22. Moreover, the pipeline control section 23 releases the wait signal so as to restart the pipeline operation and clear the contents of the DEC2 register 16 by means of an initializing clock DL2CRL at the last part of the arithmetic.

There will be explained below an operation of INC instruction shown by the instruction 32. When the INC instruction is stored in the B2R register 4 (period T9 in FIG. 3), the instruction decode section 6 recognizes the INC instruction as H/W instruction, and outputs a type of the instruction, existence/non-existence of reading/writing to the data memory 3 and a number of wait required for the arithmetic as decode signal.

In the case of the INC instruction, unlike the + instruction, since only data to be added are read from the data memory 3, the STMLD instruction is required only once. When the INC instruction is stored in the B2R register 4, HWBO is not defined. For this reason, the instruction decode section 6 decodes the INC instruction as 2 wait instruction regardless of the value of HWBO.

For period T10 since data to be added are not stored in the data storage-use register 17, the arithmetic is not executed, and the pipeline control section 23 outputs a wait signal so as to stop the pipeline operation.

For period T11 the data to be added stored in the data storage-use register 17 are read into the register of the arithmetic section 9 by the read signal of the data memory control section 22. The adder of the arithmetic section 9 increments the stack pointer. According to the data of HWBO defined at period T10, in the case of HWBO=1, a number of wait is maintained 2 wait, and in the case of HWBO=0, a number of wait is changed into one wait.

For period T12 the added result is written into the data memory 3. At this time, as for an address for the writing, the added result is written into a data memory address stored in the B3R register 5, and a write signal is generated in the data memory control section 22. Moreover, the pipeline control section 23 releases the wait signal so as to restart the pipeline operation. The contents of the DEC2 register 16 are cleared by the initializing clock DL2CRL at the end of the arithmetic.

Operation, when the + instruction of the instruction 33 is not executed, will be explained with reference to FIG. 4. In the + instruction, as mentioned above, since the value of HWBO is defined before the value is latched by the DEC1 register 15, for period T5 the pipeline control section 23 does not output the wait signal and does not stop the pipeline operation. Moreover, for period T6 the stack pointer control section 21 and the data memory control section 22 do not control the stack pointer 18, nor transmit adding data and data to be added to the register in the arithmetic section nor write the arithmetic result into the data memory 3. At the end of the period T6 the stack pointer 18 is initialized.

Operation, when the INC instruction is not executed, will be explained with reference to FIG. 4. In the INC instruction, unlike the + instruction, since the value of HWBO is not defined before the value is not latched in the DEC1 register 15, as mentioned above, for period T7 the INC instruction is decoded as 2 wait instruction. For period T8 the pipeline control section 23 outputs a wait signal so as to stop the pipeline operation.

For period T9 when HWBO is 0, the wait signal is brought into a non-active state so that the pipeline operation is restarted. The stack pointer control section 21 and the data memory control section 22 do not control the stack pointer 18 nor transmit adding data to the register in the arithmetic section nor write the arithmetic result into the data memory 3. At the end of period T9 the stack pointer 18 and the DEC2 register 16 are initialized.

Operation of the stack pointer 18 will be explained with reference to FIGS. 3 and 4. The stack pointer 18 is controlled by the stack pointer control section 21. When an instruction is executed by the arithmetic circuit 2, the stack pointer 18 indicates "0". When the STMLD instruction is executed, data are stored in the data storage-use register 17, and the stack pointer 18 is incremented. For example, since the STMLD instruction is executed twice at the stage that period T5 of FIG. 3 is ended, the value of the stack pointer 18 indicates "2".

When the + instruction is continued, before data are transmitted from the data storage-use register 17 into the register in the arithmetic section 9, the value of the stack pointer 18 is decremented and the data are transmitted. When this is repeated twice, the data which are stored at the time when the value of the stack pointer 18 is "1" and "0" are transmitted to the arithmetic section 9. At the stage that period T7 of FIG. 3 at which the + instruction is completed is completed, the value of the stack pointer 18 indicates "0". In the case of the INC instruction, the decrement of the stack pointer 18 and the transmission of the data to the arithmetic section 9 are carried out once. In the case of the non-execution, after the + instruction and INC instruction are stored in the DEC2 register 16 completely, the stack pointer 18 is initialized so that its value is returned to "0".

The case when the data shown by the instruction 32 of FIG. 2 are not the content of D0 in the data memory 3 but a constant will be explained here. In this case, a constant to be added is stored in the address specification section (see FIG. 5) in the instruction codes in the sequence program memory 1. When this instruction is stored in the B2R register 4 (period T3 in FIG. 3), this instruction is recognized as an instruction for latching constant data in the sequence program memory 1. For period T4 the constant data are stored in the constant latch register 12, and for period T5 the constant data are stored in the data storage-use register 17 shown by the stack pointer 18, and in the following + instruction, the addition is executed similarly.

As mentioned above, according to the conductive/non-conductive information (HWBO) at a contact point, the instruction decode section 6 judges execution/non-execution. At the time of the execution, reading/writing of the arithmetic data between the data memory 3 and the arithmetic section 9 and the arithmetic are executed. At the time of the non-execution, the reading/writing of the arithmetic data between the data memory 3 and the arithmetic section 9 and the arithmetic are not executed so that the processing cycle is shortened. For this reason, the processing time at the time of the non-execution can be sped up.

Figure 6:
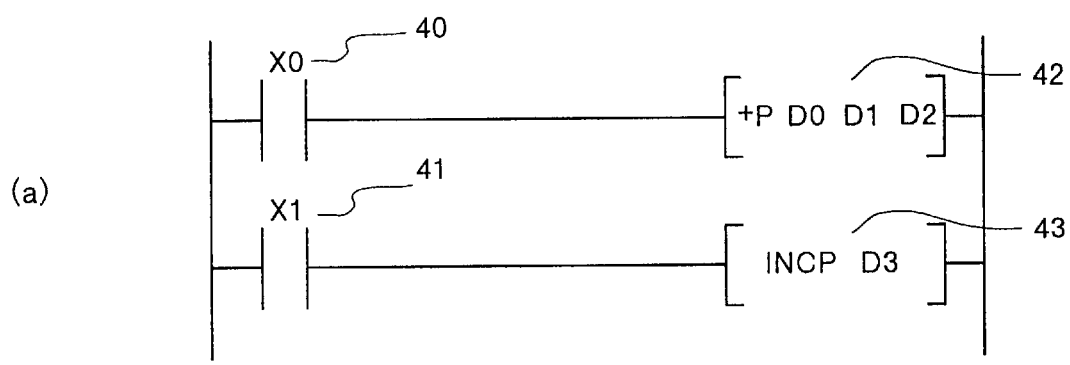
FIGS. 6(a) and 6(b) are a ladder circuit diagram and an instruction code list diagram showing another operation of the programmable controller of the present invention.

FIGS. 6(*a*) and 6(*b*) show the ladder circuit of the sequence program and the contents of the instruction codes (example 2). In FIG. 6(*a*), 40 and 41 are instructions (symbols) for reading out states of the X0 device and X1 device stored in the data memory 3 so as to store the states into the conductive/non-conductive information storage section 7. 42 is an instruction (symbol) for adding read data D0 and D1 with scanning that the state of the conductive/non-conductive information storage section 7 is changed from 0 (off) into 1 (on) and storing the arithmetic result into D2. 43 is an instruction (symbol) for adding 1 to word data D3 at the scanning that the state of the conductive/non-conductive information storage section 7 is changed from 0 (off) into 1 (on) and so as to store the arithmetic result into D3. As shown in FIG. 6(*b*), the instruction codes stored in the sequence program memory 1 are a combination that the instruction of the a+3 address shown in FIG. 2 is replaced by "+P, D2" and the instruction of the a+6 address is replaced by "+INCP, D3". The + instruction and +P instruction are distinguished by bit of pulse specification in the instruction codes shown in FIG. 5.

Figure 7:
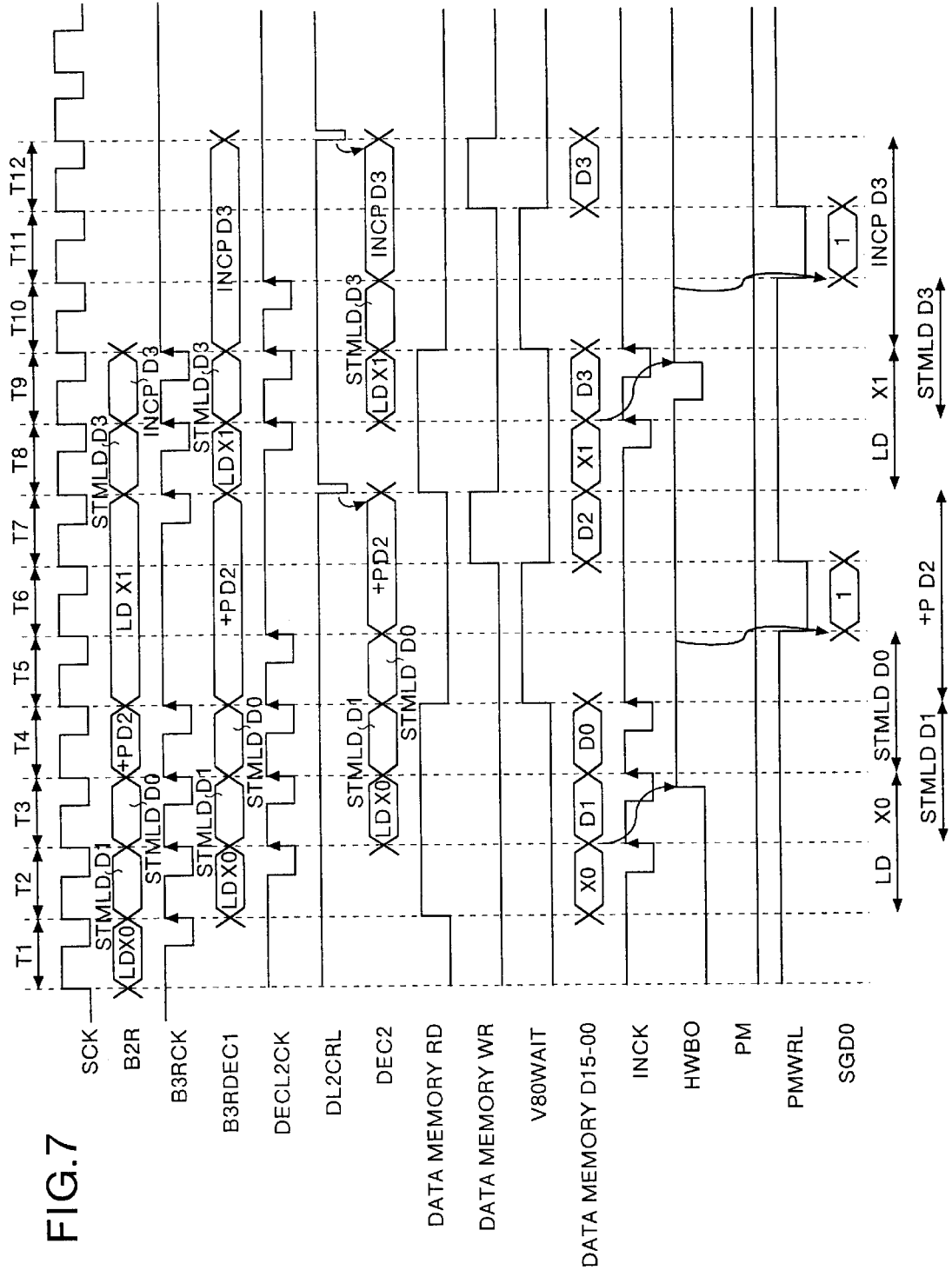
FIG. 7 is a timing chart when the ladder circuit shown in FIG. 6(a) is operated.
Figure 8:
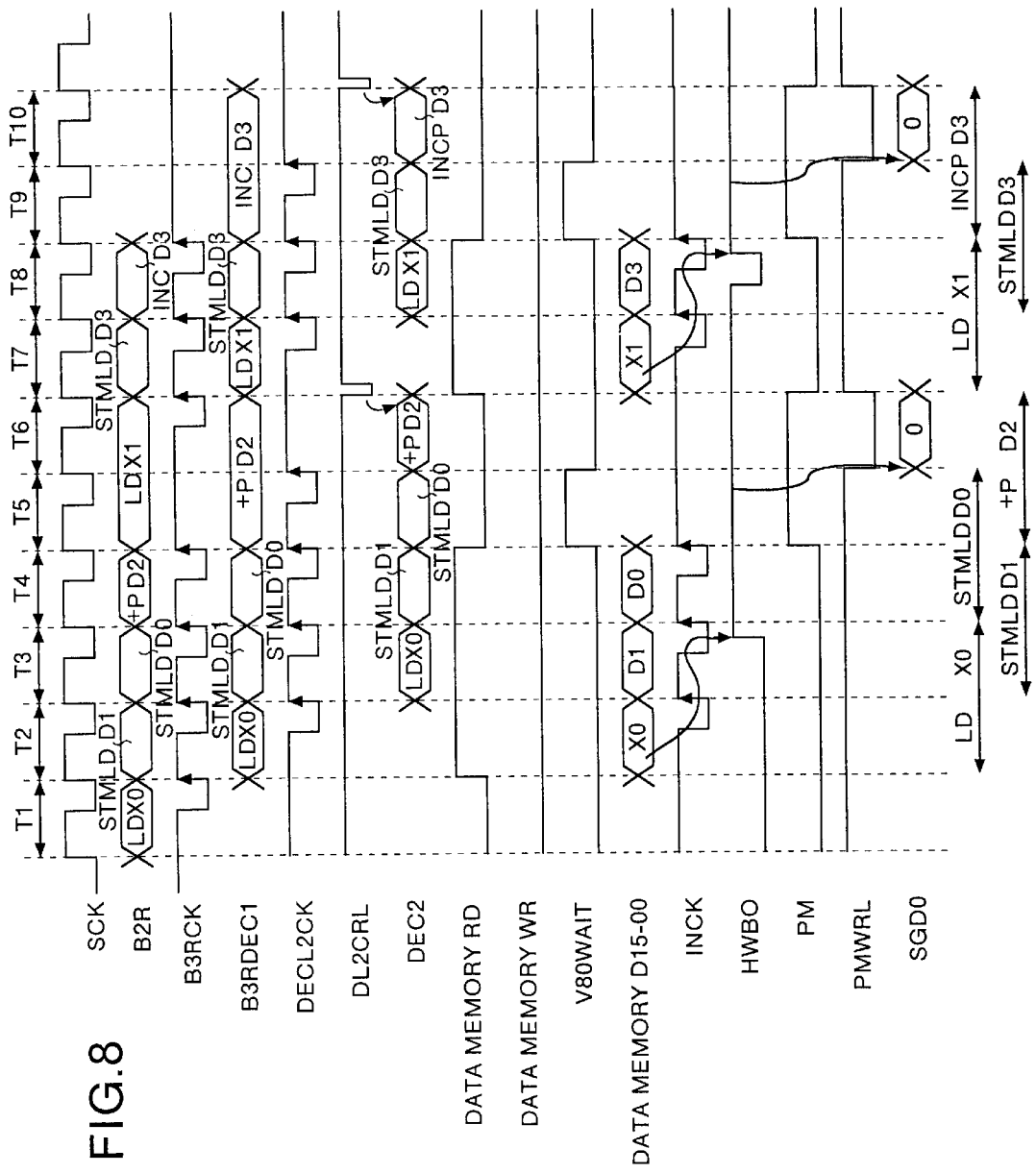
FIG. 8 is a timing chart when the ladder circuit shown in FIG. 6(a) is not operated.

FIG. 7 is a timing chart showing the operation in the case where when the ladder circuit of example 2 shown in FIG. 6 is operated by the arithmetic circuit 2 shown in FIG. 1, the instructions 42 and 43 are executed. FIG. 8 is a timing chart showing the operation when the instructions 42 and 43 are not executed.

In FIGS. 7 and 8, PMWRL is a write signal for the execution flag bit of the sequence program memory 1 shown in FIG. 5, PM is data of the execution flag bit shown in FIG. 5, and SGDO is data to be written into the execution flag bit (PM at next scanning). In FIGS. 7 and 8, the same reference symbols in FIGS. 3 and 4 are given to the data which are the same as those in the timing charts of FIGS. 3 and 4.

Figure 9:
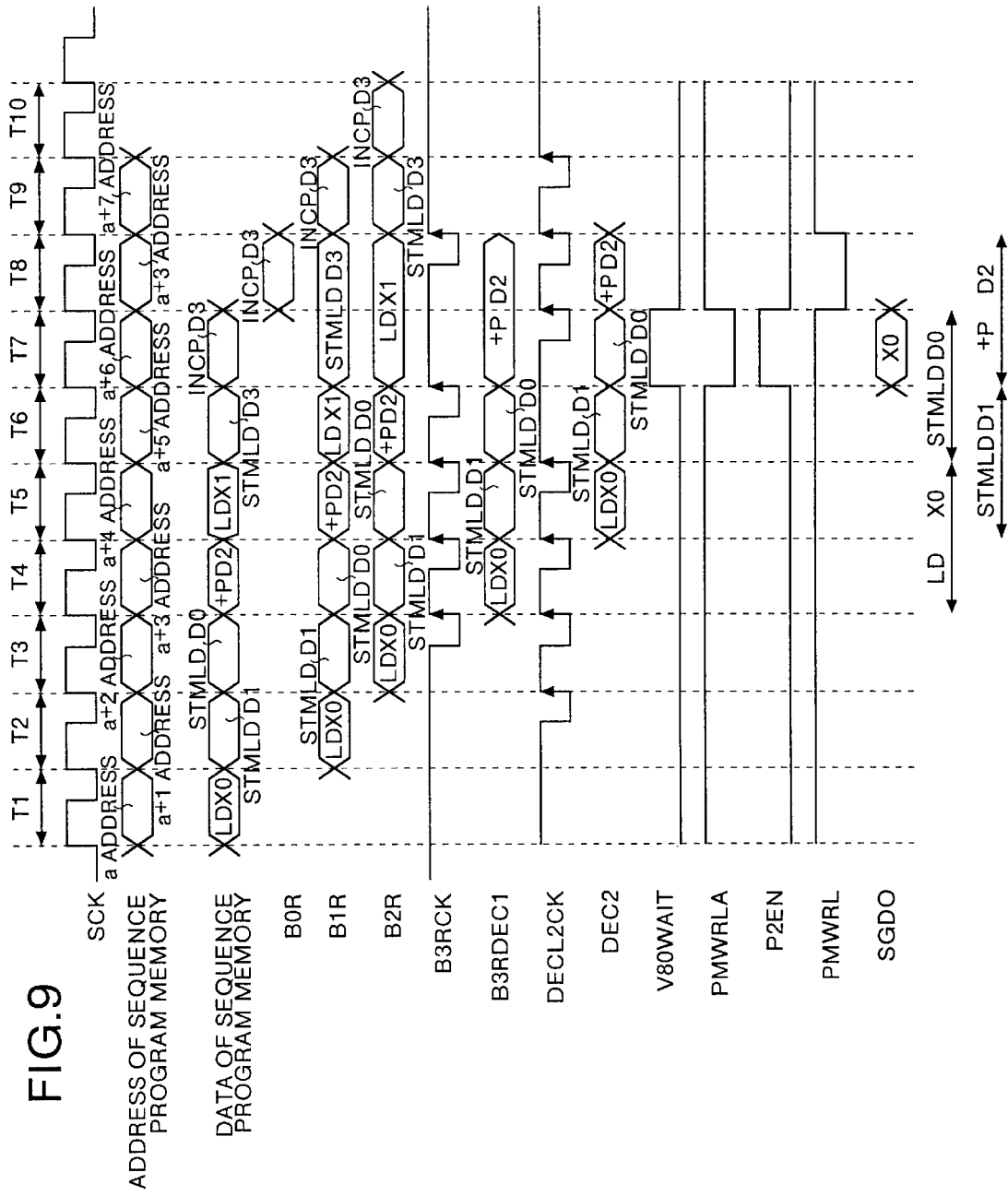
FIG. 9 is a timing chart showing an operation of a pipeline register when the ladder circuit shown in FIG. 6(a) is not operated.
Figure 10:
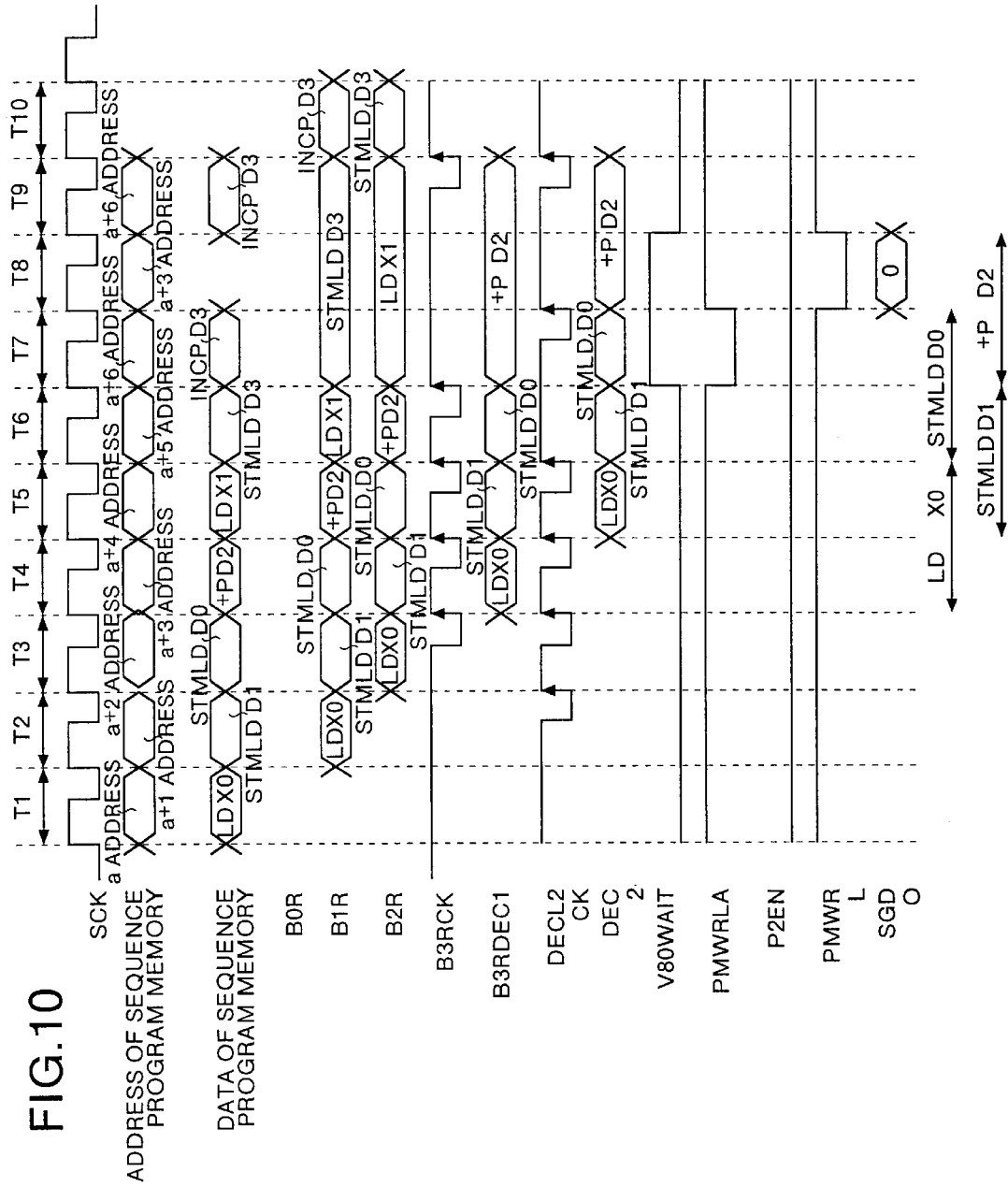
FIG. 10 is a timing chart showing an operation of the pipeline register when the ladder circuit shown in FIG. 6(a) is operated.

In addition, FIGS. 9 and 10 are timing charts showing the operations of the sequence program memory 1 and the pipeline register when the ladder circuit of example 2 shown in FIG. 6 is operated by the arithmetic circuit 2 shown in FIG. 1. FIG. 9 shows the case where the instructions 42 and 43 are not executed. FIG. 10 shows the case where the instructions 42 and 43 are executed.

There will be explained below the operation according to the sequence program of example 2. There will be explained below a difference in the operation between the instruction 32 in FIG. 2 and the instruction 42 in FIG. 6. When the contact point is conductive by the instruction 30, the instruction 32 in FIG. 2 executes the arithmetic of D0+D1 D2 per scanning while the contact point is conductive. For this reason, when the values of D0 and D1 change per scanning, the value of D2 also changes per scanning. On the contrary, when the contact point is conductive by the instruction 40, the instruction 42 in FIG. 6 executes the arithmetic of D0+D1 D2 at only scanning where the contact point is conductive. For this reason, even if the values of D0 and D1 change per scanning, the value of D2 does not change as long as the contact point does not change in a manner that conductive non-conductive conductive.

Operation when the +P instruction shown by the instruction 41 is executed will be explained here with reference to FIG. 7. When the +P instruction is stored in the B2R register 4 (period T4 in FIG. 7), the instruction decode section 6 recognizes the +P instruction as H/W instruction, and outputs a type of the instruction, existence/non-existence of the reading/writing into the data memory 3 and a number of wait required for the arithmetic as decode signal. At this time, the +P instruction is recognized as a pulse operation according to pulse specified bit in the instruction codes shown in FIG. 5, and the instruction decode section 6 executes the arithmetic when AND of HWBO and inverted PM is 1. For this reason, in the case of 2 wait and where AND of HWBO and inverted PM is 0, the arithmetic is not executed, and this instruction is decoded as wait instruction.

There will be explained below the case where AND of HWBO and inverted PM is 1. For period T5 since adding data and data to be added are not stored in the data storage-use register 17, the arithmetic is not executed, and only the wait signal is outputted from the pipeline control section 23 so as to stop the pipeline operation.

For period T6 the adding data and the data to be added stored in the data storage-use register 17 are read into the register in the arithmetic section 9 by the read signal of the data memory control section 22. The addition is executed by the adder in the arithmetic section 9, and the value of HWBO (HWBO=1) is written as data of the execution flag bit in the sequence program memory 1. The pipeline operation will be explained later.

For period T7 the added result is written into the data memory 3. At this time, as an address of the data memory 3 for writing, the added result is written into the data memory address stored in the B3R register 5, and the write signal is generated in the data memory control section 22. Moreover, the pipeline control section 23 releases the wait signal so as to restart the pipeline operation. At the end of the arithmetic, the contents of DEC2 are cleared by the initializing clock DL2CRL.

There will be explained below the operation of the +P instruction at next scanning with reference to FIG. 8. At this scanning, for period T6 in FIG. 7, 1 is written into PM. For this reason, when the instruction code of the +P instruction is stored in the B2R register 4 for period T4 in FIG. 8, AND of HWBO and inverted PM becomes 0 regardless of the value of HWBO, and the +P instruction is decoded as non-execution instruction. The arithmetic is not executed for period T5, and only the wait signal is outputted from the pipeline control section 23 so as to stop the pipeline operation.

Further, for period T6 the wait signal is brought into a non-active state so as to restart the pipeline operation. The stack pointer control section 21 and the data memory control section 22 do not control the stack pointer 18 nor transmit the data to be added and the adding data to the register in the arithmetic section nor write the arithmetic result into the data memory 3. At the end of period T6 the stack pointer 18 and the DEC2 register 16 are initialized, and the value of HWBO is written as data of the execution flag bit of the sequence program memory 1. In the case of HWBO=1 (contact point is conductive), PM at next scanning becomes 1. As a result, the operation which is the same as the state for period T4 shown in FIG. 8 is performed. Moreover, in the case of HWBO=0 (contact point is not conductive), PM becomes 0 (initialized state). Further, when HWBO becomes 1 at the next scanning, the operation which is the same as that for period T4 shown in FIG. 7 is performed. When HWBO becomes 0, the operation which is the same as that for period T4 shown in FIG. 8 is performed.

There will be explained below the operation when the INCP instruction is executed with reference to FIG. 7. When the INCP instruction is stored in the B2R register 4 (period T9 in FIG. 7), the instruction decode section 6 recognizes the INCP instruction as H/W instruction, and outputs a type of the instruction, existence/non-existence of the reading/writing to the data memory 3 and a number of wait required for the arithmetic as decode signal. At this time, similarly to the INC instruction, when the INCP instruction is stored in the B2R register 4, HWBO is not defined. For this reason, the instruction decode section 4 decodes the INCP instruction as 2 wait instruction regardless of the values of HWBO and PM.

For period T10 the arithmetic is not executed, and the pipeline control section 23 outputs a wait signal so as to stop the pipeline operation, and obtains AND of HWBO and inverted PM. For period T11 the data to be added stored in the data storage-use register 17 are read into the register in the arithmetic section 9 by the read signal of the pipeline control section 23, and the adder in the arithmetic section 9 executes increment. The value of HWBO (here, HWBO=1) is written as data of the execution flag bit of the sequence program memory 1.

Finally, for period T12 the added result is written into the data memory 3. At this time, as for an address of the data memory 3 for writing, the added result is written into the data memory address stored in the B3R register 5, and the write signal is generated in the data memory control section 22. Moreover, the pipeline control section 23 releases the wait signal so as to restart the pipeline operation. At the end of the arithmetic, the contents of the DEC2 register 16 are cleared by the initializing clock DL2CRL.

There will be explained below the operation of the INCP instruction at next scanning with reference to FIG. 8. At this scanning, since 1 is written into PM for period T11 in FIG. 7, AND of HWBO and inverted PM becomes 0 for period T9, and for period T10 the wait signal is brought into the non-active state so as to restart the pipeline operation. The stack pointer control section 21 and the data memory control section 22 do not control the stack pointer 18 nor transmit the data to be added to the register in the arithmetic section nor write the arithmetic result into the data memory 3. At the end of period T10 the stack pointer 18 and the DEC2 register 16 are initialized, and the value of HWBO is written as data of the execution flag bit of the sequence program memory 1.

In the case of HWBO=1 (contact point is conductive), the PM at the next scanning becomes 1. For this reason, the operation which is the same as the state for period T8 shown in FIG. 8 is performed. Moreover, in the case of HWBO=0 (contact point is not conductive), PM becomes 0 (initialized state). Further, when HWBO becomes 1 at the next scanning, the operation which is the same as that for period T9 shown in FIG. 7 is performed. When HWBO becomes 0, the operation which is the same as that for period T9 shown in FIG. 8 is performed.

There will be explained below the operation of the pipeline register when the instruction codes are read from the sequence program memory 1 and data are written into the execution flag bit when the +P instruction and the INCP instruction are stored in the sequence program memory 1 so that an operation is performed with reference to FIGS. 9 and 10.

FIGS. 9 and 10 are diagrams showing the operation of the pipeline register of the sequence program shown in FIG. 6. FIG. 9 is a diagram showing the operation of the pipeline register when the +P instruction is not executed. FIG. 10 is a diagram showing the operation of the pipeline register when the +P instruction is executed.

In FIGS. 9 and 10, B1R is an input register which stores the instruction codes stored in the sequence program memory 1 and transmits them to the B2R register 4. A PMWRLA signal is a control signal which is brought into a low active state and subtracts 3 from the address of the sequence program memory 1 when data are written into the execution flag bit. P2EN is a control signal which saves the data to be read from the sequence program memory 1. B0R is a register which saves the instruction cords according to the P2EN signal.

As shown in FIGS. 9 and 10, the instruction codes stored in the sequence program memory 1 are transmitted to the pipeline register while the address of the sequence program memory 1 is incremented in a manner that a address→a+1 address→a+2 address in order. At this time, when the instruction for writing data into the execution flag bit is stored in the B2R register 4 (period T6 in FIGS. 9 and 10), this instruction is judged as pulse arithmetic by the pulse specified bit in the instruction codes shown in FIG. 5. The PMWRLA signal is outputted for period T7 in FIGS. 9 and 10. When the PMWRLA signal is outputted, 3 is subtracted from the address of the sequence program memory 1 at the next scanning (period T8 in FIGS. 9 and 10) so that the contents of the execution flag bit are written into the address where the +P instruction is stored. At this time, a cycle that the +P instruction is stored in the B3R register 5 includes a cycle that the instruction in the a+6 address is fetched and a cycle that data are written into the execution flag bit in the a+3 address. For this reason, for period T4 in FIG. 8, +P instruction is decoded as 1 wait instruction.

There will be explained below the operation of the P2EN signal and the B0R register. In the instruction for writing data into the execution flag bit, when the execution cycle is completed with 2 cycles, the P2EN signal becomes active with a cycle that the corresponding instruction code is stored in the B3R register 5. For example, period T7 in FIG. 9 corresponds to this case. When the P2EN signal becomes active, the instruction codes for period T7 are temporarily saved in the B0R register for period T8. 3 is subtracted from the address of the sequence program memory 1 with the saving cycle, and the contents of the execution flag bit are written into the address where the +P instruction is stored. Further for period T9 the instruction codes which are saved in the B0R register are transmitted to the B1R register so that the pipeline operation is performed.

There will be explained below the operation in the case of three or more cycles with reference to FIG. 10. In the case of three or more cycles, since the a+6 address can be fetched again for period T9 in FIG. 10, the process for saving into the BOR register is not executed, and the instruction codes are transmitted from the sequence program memory 1 to the B1R register.

As mentioned above, according to the conductive/non-conductive information (HWBO) at the contact point and the execution flag bit (PM), the instruction decode section and the control section judge execution/non-execution. At the time of the execution, the arithmetic is executed, and at the time of non-execution, the arithmetic is not executed so that the processing cycle is shortened. As a result, the processing time at the time of non-execution can be sped up. Moreover, the conductive/non-conductive information (HWBO) are written into a corresponding bit in the sequence program memory so as to be capable of being used for the execution bit at next scanning. For this reason, the instruction for executing only the scanning when the contact point is ON can be processed with high speed by the H/W arithmetic circuit, and the processing time can be sped up.

FIGS. 11(a) and 11(b) show the ladder circuit of the sequence program and contents of the instruction codes (example 3). In FIG. 11(a), 50 and 51 are instructions (symbols) for reading out states of the X0 device and X1 device stored in the data memory 3 so as to store the states into the conductive/non-conductive information storage section 7. 52 is an instruction (symbol) for adding double word data stored in D0 and D1 and double word data stored in D2 and D3 when the state of the conductive/non-conductive information storage section 7 is 1 (on) so as to store the added result into D4 and D5. 53 is an instruction (symbol) for adding 1 to double word data stored in D6 and D7 so as to store the added result into D6 and D7. In the instructions 52 and 53, the arithmetic data are data of double words.

The instruction codes to be stored in the sequence program memory 1 are a combination that the instructions in the a+1 address, a+2 address and a+5 address in FIG. 2 are replaced by DSTMLD instruction, and the instruction in the a+3 address is replaced by D+ instruction, and the instruction in a+6 address is replaced by DINC instruction. Moreover, these instructions are distinguished from the instructions shown in FIG. 2 by data length bit in the instruction codes shown in FIG. 5.

Figure 12:
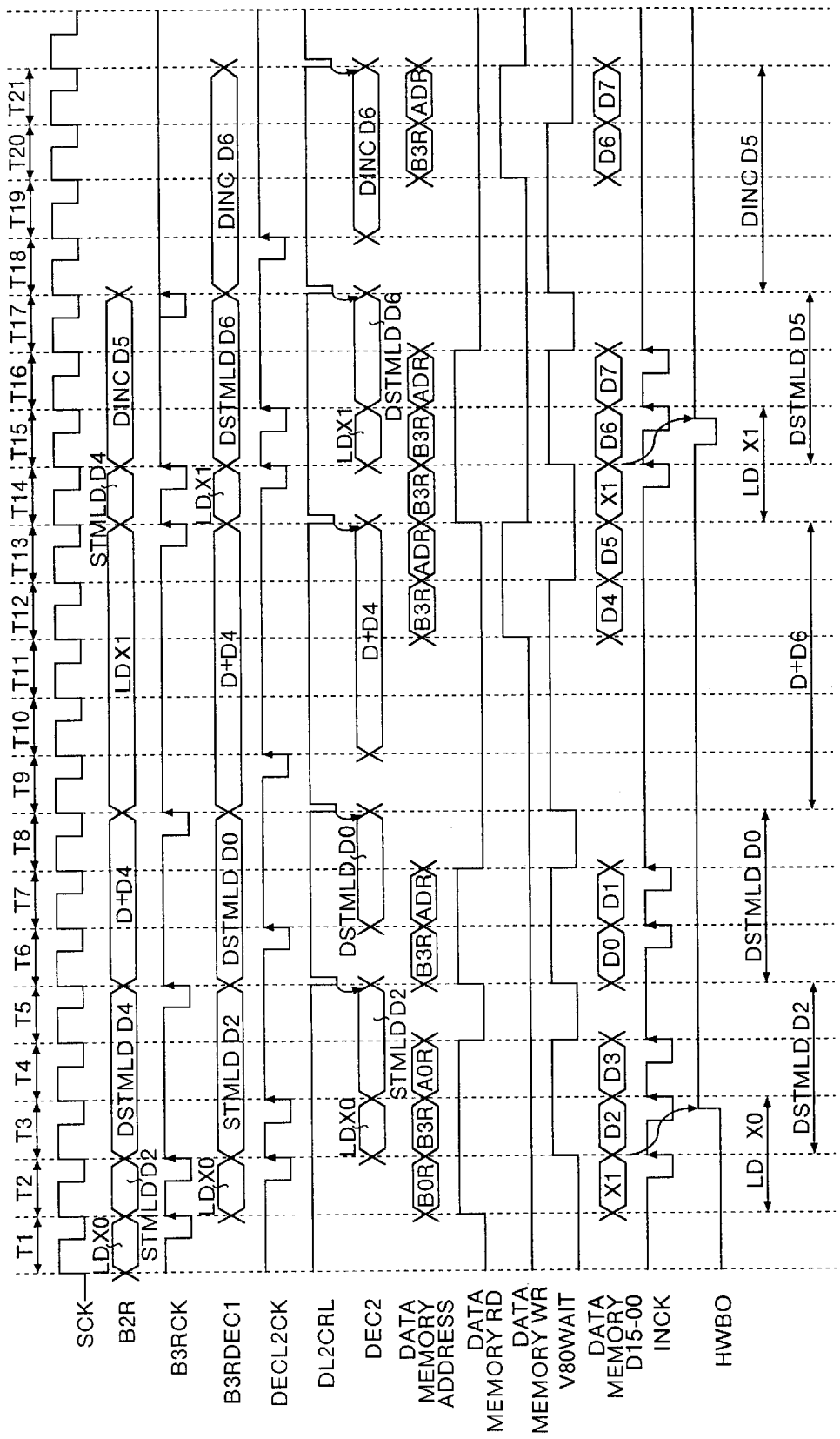
FIG. 12 is a timing chart when the ladder circuit shown in FIG. 11(a) is operated.
Figure 13:
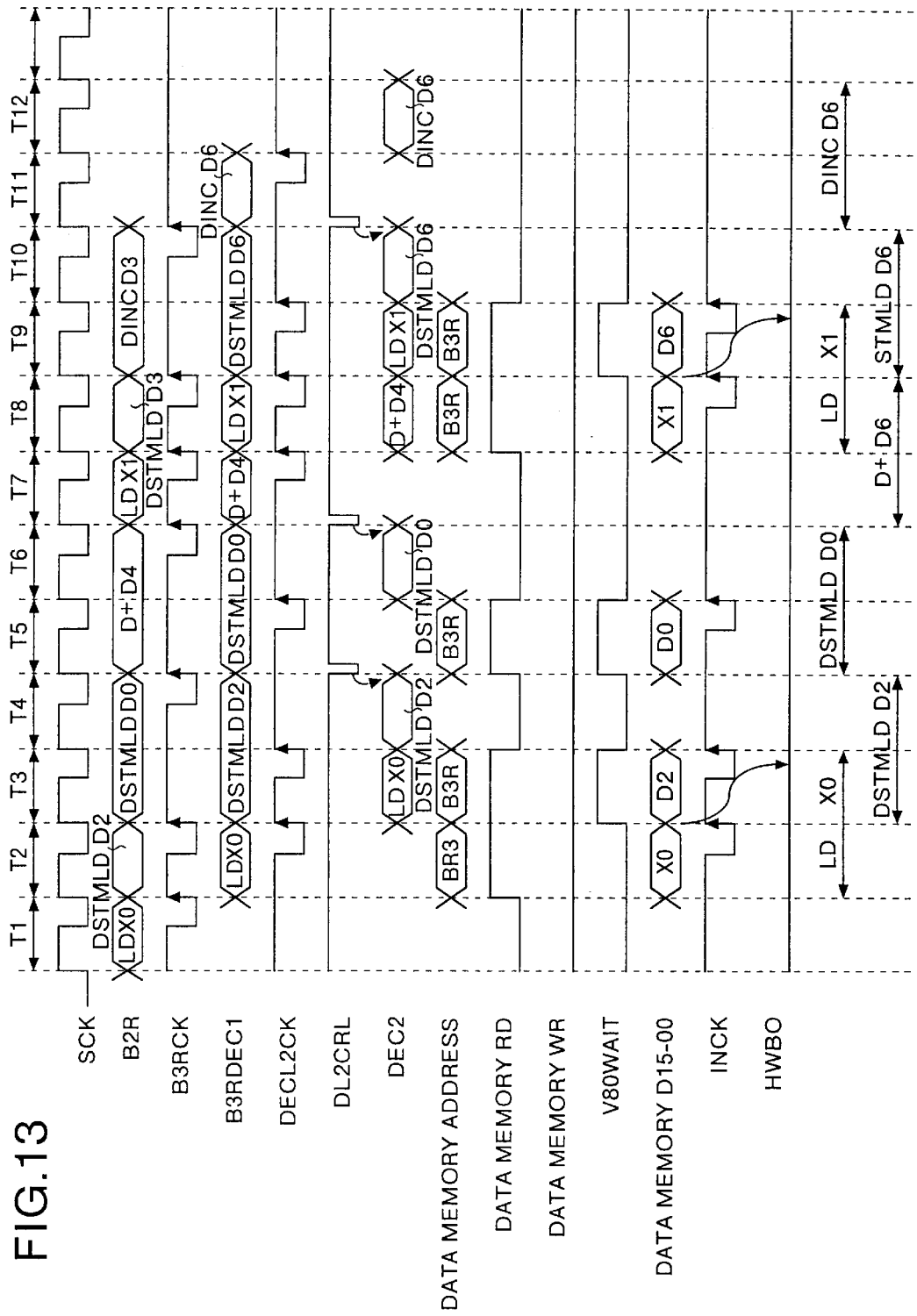
FIG. 13 is a timing chart when the ladder circuit shown in FIG. 11(a) is not operated.

FIG. 12 is a timing chart showing the operation when the instructions 52 and 53 are executed when the ladder circuit of example 3 shown in FIG. 11 is operated by the arithmetic circuit 2 shown in FIG. 1. FIG. 13 is a timing chart showing the operation when the instructions 52 and 53 are not executed. B3R of the address in the data memory shown in FIGS. 12 and 13 shows that the value of the B3R register 5 becomes a data memory address, and ADR shows that the value of the address register 19 becomes a data memory address.

There will be explained below the operation according to the sequence program of example 3. There will be explained below the operation when the DSTMLD instruction is executed with reference to FIG. 12. When the instruction codes of the DSTMLD instruction are stored in the B2R register 4 (period T2 in FIG. 12), the instruction decode section 6 recognizes the DSTMLD instruction as H/W instruction, and outputs a type of the instruction, existence/non-existence of the reading/writing to the data memory 3 and a number of wait required for the arithmetic as decode signal. For period T3 the contents of the B2R register 4 are stored in the B3R register 5 by the clock B3RCK, and the contents decoded for period T1 are latched in the DEC1 register 15. Thereafter, data are read from the data memory address stored in the B3R register 5 into the input register 14. Moreover, the address stored in the B3R register at this time is latched in the address register 19 so as to be incremented.

For period T4 the instruction decode section 6 judges execution (HWBO=1)/non-execution (HWBO=0) from the value of HWBO according to the arithmetic of the last LD instruction. When HWBO is 1, according to the operations of the stack pointer control section 21 and the data memory control section 22, the contents of the input register 14 are stored in the data storage-use register 17 shown by the stack pointer 18, and the value of the stack pointer 18 is incremented. Moreover, the address for the data memory 3 is changed from the B3R register into the address register 19, and the data in the data memory 3 are read into the input register 14. As a result, the data are read from the +1 address stored in the B3R register 5.

For period T5 the contents of the input register 14 read for period T4 are stored in the data storage-use register 17 shown by the stack pointer 18, and the value of the stack pointer 18 is incremented. At this time, the arithmetic section 9 and the conductive/non-conductive information storage section 7 are not operated.

There will be explained below the case where the DSTMLD instruction is not executed with reference to FIG. 13. In FIG. 13, for periods T2 and T3 the operation which is the completely same as that shown in FIG. 12 is performed. However, when HWBO becomes 0 for period T4, V80WAIT signal which stops the pipeline operation and read signal for the data memory 3 are brought into the non-active state so that the pipeline operation is restarted and the reading of the data memory 3 is stopped. Moreover, for period T3 the data read into the input register 14 are not transmitted to the data storage-use register 17 and the process is ended.

There will be explained below the operation of the D+ instruction with reference to FIGS. 12 and 13. In the D+ instruction, since the instruction for reading data from the data memory 3 is executed twice, the value of HWBO is defined at the stage that the D+ instruction is stored in the B2R register 4. For this reason, when HWBO is 1, the instruction decode section 6 executes the arithmetic. In the case of 4 wait and HWBO=0, the instruction decode section 6 does not execute the arithmetic. As a result, the D+ instruction is decoded as 0 wait instruction so as to be transmitted to the B3R register 5.

When HWBO is 1, the arithmetic is not executed for period T9, and the pipeline control section 23 outputs only the wait signal so as to stop the pipeline operation. Moreover, the contents of the B3R register 5 are transmitted to the address register 19 so that increment is carried out.

For periods T10 and T11 the stack pointer 18 is decremented and simultaneously adding data and data to be added stored in the data storage-use register 17 are read in the register in the arithmetic section 9. Further, addition is carried out by the adder in the arithmetic section 9. For period T12 the added result is written into the data memory 3. At this time, as for an address for writing, data of low-order 16 bits are written into the data memory address stored in the B3R register 5. Moreover, the write signal is generated in the data memory control section 22.

Furthermore, the wait signal is released so as to restart the pipeline operation. For period T13, similarly to the DSTMLD instruction, the value of the address register 19 is used as a data memory address and data of high-order 16 bits are written. Moreover, the wait signal is released so as to restart the pipeline operation, and at the end of the arithmetic, the contents of the DEC2 register 16 are cleared by the initializing clock DL2CRL.

On the contrary, when HWBO=0, at the stage that the D+ instruction is transmitted to the B3R register 16, this instruction is decoded as 0 wait instruction. For this reason, the pipeline operation is not stopped by the V80WAIT signal, the stack pointer 18 is not controlled, the addition is not carried out by the adder, and the added result is not written into the data memory 3. At the end of period T7 only the stack pointer 18 is initialized.

Operation of the DINC instruction will be explained here with reference to FIGS. 12 and 13. In the D+ instruction, the instruction for reading data from the data memory 3 is executed only once. However, differently from the INC instruction shown in FIG. 2, the last DSTMLD instruction stops at least one cycle pipeline operation. For this reason, the instruction codes of the DINC instruction are stored in the B2R register 4 and before being transmitted to the B3R register 5, the value of HWBO is defined. For this reason, when HWBO is 1, since the instruction code section 6 executes the arithmetic. For this reason, in the case of 3 wait and HWBO=0, since the instruction decode section 6 does not execute the arithmetic, the DINC instruction is decoded as 0 wait instruction so as to be transmitted to the B3R register 5.

When HWBO is 1, for period T9 the arithmetic is not executed, and the pipeline control section 23 outputs only the wait signal so as to stop the pipeline operation. Moreover, the contents of the B3R register 5 are transmitted to the address register 19 and increment is executed.

For period T19 while the stack pointer 18 is decremented, data to be added stored in the data storage-use register 17 are read into the register in the arithmetic section 9, and addition is executed by the adder in the arithmetic section 9. At this time, since the data to be transmitted from the data storage-use register 17 to the register in the arithmetic section 9 are only the data to be added, the transmission of the DINC instruction is completed with one cycle.

For period T20 the added result is written into the data memory 3. At this time, as for an address for wiring, data of low-order 16 bit are written into the data memory addressed stored in the B3R register 5, and the write signal is generated in the data memory control section 22. Further, the wait signal is released so as to restart the pipeline operation. At the same time, for period T13 similarly to the DSTMLD instruction, the value of the address register 19 is used as data memory address and data of high-order 16 bit are written. Moreover, the wait signal is released so as to restart the pipeline operation, and at the end of the arithmetic, the contents of DEC2 are cleared by the initializing clock DL2CRL. Since the operation in the case where the DINC instruction is not executed is the completely same as the operation of the D+ instruction, the description thereof is omitted.

There will be explained below an instruction for executing only scanning in the case of double word and where the state of the conductive/non-conductive information storage section 7 is changed from 0 (off) into 1 (on) like the D+P instruction and DINCP instruction.

Similarly to the D+ instruction and DINC instruction, in the D+P instruction and DINCP instruction, HWBO is defined at the stage that the instruction codes are stored in the B2R register 4. As a result, according to AND of HWBO and inverted PM, in the case where execution condition is established, the D+P instruction and DINCP instruction are transmitted as 4 wait and 3 wait instructions from the B2R register 4 to the DEC1 register 15. In the case where the execution condition is not established, similarly to the +P instruction shown in FIG. 8, the instructions are decoded as 1 wait instruction.

At this time, when the execution condition is established, similarly to the +P instruction in FIG. 10, at the stage that the instruction codes are stored in the DEC2 register 16, 3 is subtracted from the address of the sequence program memory 1 and the execution flag bit is written. With and after next cycle, the instruction is fetched. On the contrary, when the execution condition is not established, similarly to the +P instruction in FIG. 9, at the stage that the instruction codes are stored in the DEC1 register 16, the instruction is saved in the B0R register. Further, at the stage that the instruction codes are stored in the DEC2 register 16, 3 is subtracted from the address of the sequence program memory 1 and the execution flag bit is written. With next cycle the instruction codes which are saved in the B0R register are transmitted to the B1R register.

As mentioned above, in the case where the instruction of double word is executed, the address for the data memory 3 is incremented so that an address is generated, and the double word data are read/written to the data memory 3. For this reason, the instruction of double word can be processed with high speed by the H/W arithmetic circuit, and the time for processing the instruction of double word can be sped up.

FIGS. 14(*a*) and 14(*b*) show the ladder circuit of the sequence program and contents of the instruction codes (example 4). In FIG. 11(*a*), 60 is an instruction (symbol) for reading the state of X0 device stored in the data memory 3 and storing the state into the conductive/non-conductive information storage section 7. 61 is an instruction (symbol) for comparing double word data stored in D0 and D1 in the data memory 3 with double data word stored in D2 and D3 and storing AND of the compared result and HWBO into the conductive/non-conductive information storage section 7. 62 is MOV instruction.

Figure 15:
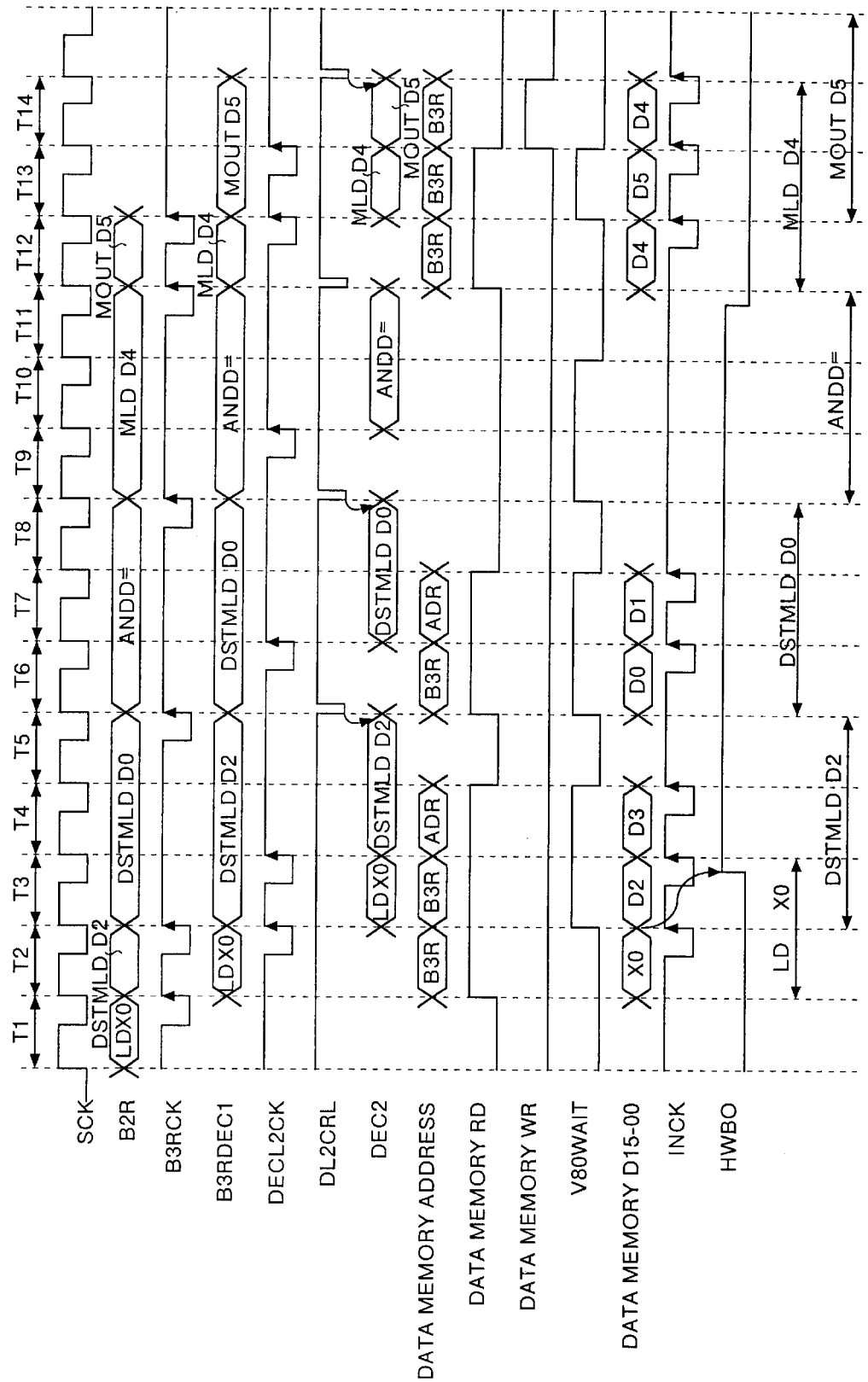
FIG. 15 is a timing chart when the ladder circuit shown in FIG. 14(a) is operated.
Figure 16:
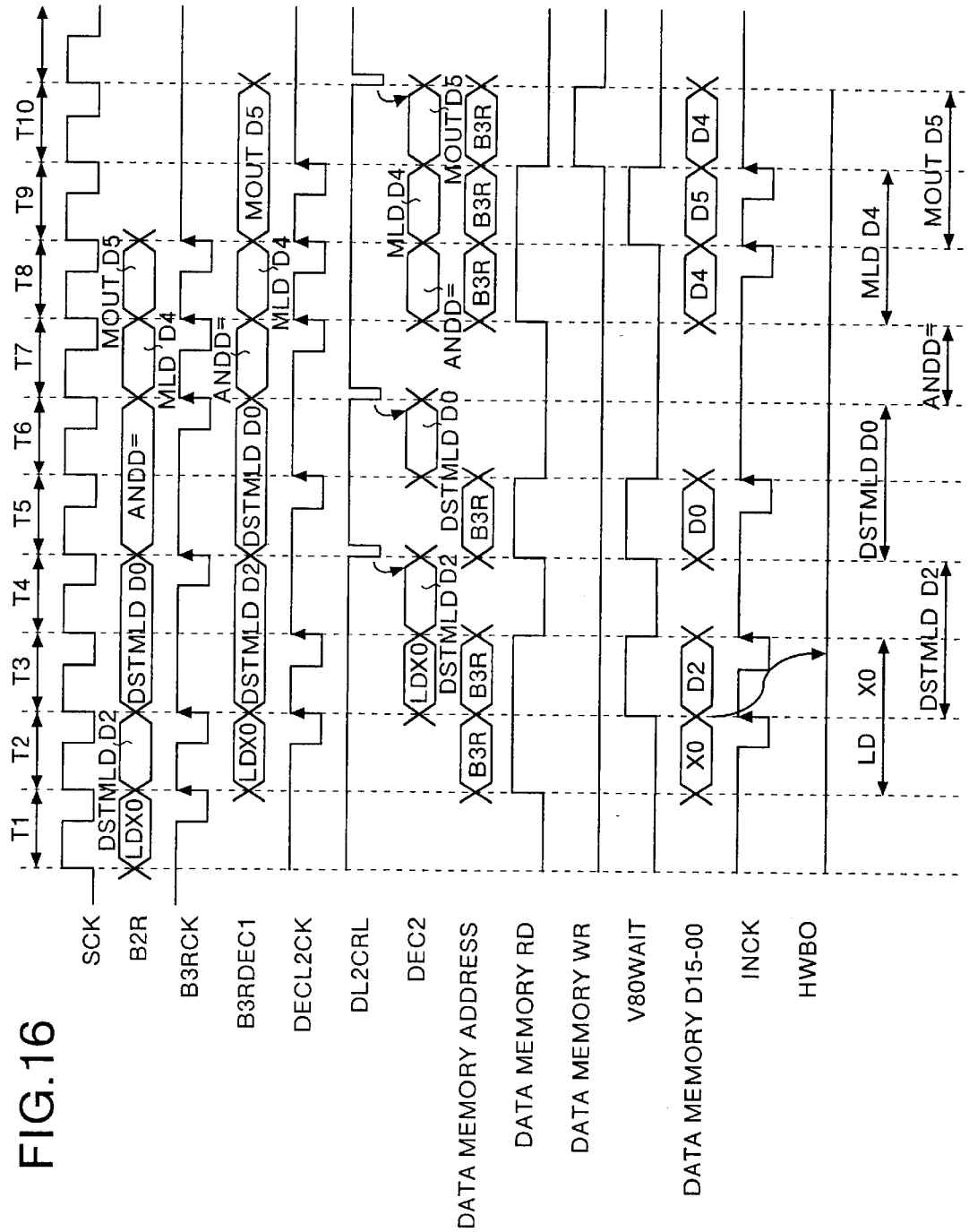
FIG. 16 is a timing chart when the ladder circuit shown in FIG. 14(a) is not operated.

The instruction codes of the instruction 51 stored in the sequence program memory 1 are a combination of the DSTMLD instructions in the a+1 address and a+2 address and ANDD=instruction in the a+3 address. FIG. 15 is a timing chart showing the operation in the case where the instruction 61 is executed when the ladder circuit shown in FIG. 14 is operated by the arithmetic circuit 2 shown in FIG. 1. FIG. 16 is a timing chart showing the operation in the case where the instruction 61 is not executed. B3R in the address of the data memory 3 shown in FIGS. 15 and 16 shows that the value of the B3R register becomes a data memory address. ADR shows that the value of the address register 19 becomes a data memory address.

Figure 17:
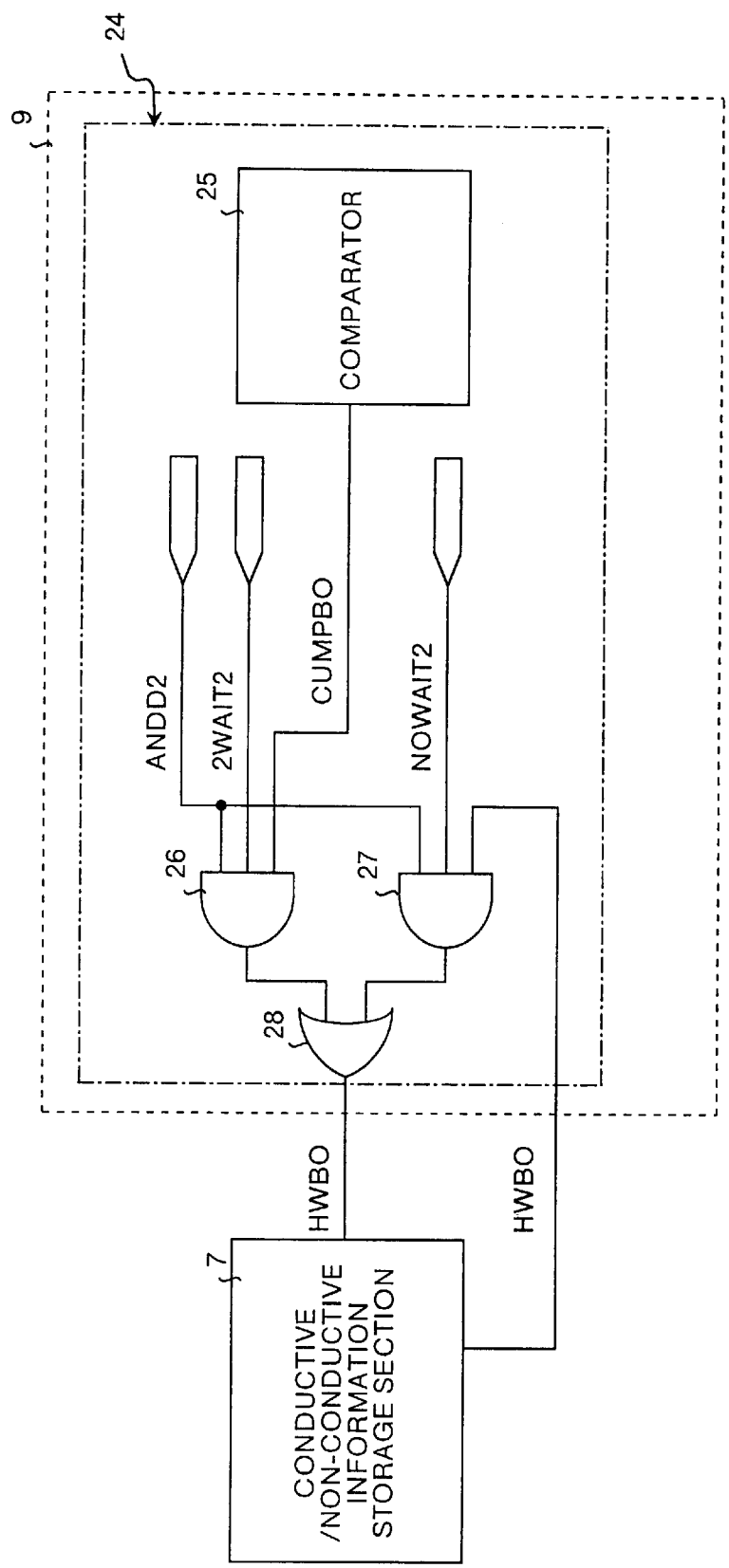
FIG. 17 is a block diagram of an arithmetic circuit and a conductive/non-conductive information storage section in the ladder circuit shown in FIG. 14(a)

FIG. 17 is a circuit diagram of an arithmetic circuit 24 in the arithmetic section 9 for processing the ANDD= instruction shown in FIG. 14 and the conductive/non-conductive information storage section 7. The arithmetic circuit 24 has a comparator 25, AND circuits 26 and 27, and an OR circuit 28. In this circuit diagram, when the compared result from the comparator 25 coincides, a COMPBO signal outputs 1, and when not coincide, the COMPBO signal outputs 0. ANDD2 and 2WAIT2 and NOWAIT2 are decode signals latched by the DEC2 register 5. In the case of a corresponding instruction, the decode signals output 1.

The AND circuit 26 obtains AND of the COMPBO signal, the ANDD2 signal and 2WAIT2 signal. The AND circuit 27 obtains AND of the ANDD2 signal, the NOWAIT2 signal and the HWBO signal. The OR circuit 28 obtains OR of output signals from AND gates 26 and 27 so as to output OR to the conductive/non-conductive information storage section 7. Data are written into the conductive/non-conductive information storage section 7 by another instruction, but in FIG. 17, this circuit is omitted.

There will be explained below the operation according to the sequence program of example 4. There will be explained below the operation in the case where the ANDD= instruction is executed with reference to FIG. 15. At the stage that the ANDD=instruction is stored in the B2R register 4 (period T6 of FIG. 15), the value of HWBO is defined. In the case of HWBO=1, the instruction decode section 6 executes arithmetic, and in the case of 2 wait and HWBO=0, the instruction decode section 6 does not execute arithmetic. As a result, the ANDD=instruction is decoded as 0 wait instruction so as to be transmitted to the B3R register 5. In the case of HWBO=1, for period T9 the arithmetic is not executed, and the pipeline control section 23 outputs only the wait signal so as to stop the pipeline operation.

For periods T10 and T11, while the stack pointer 18 is decremented, the comparison data stored in the data storage-use register 17 are read to the register in the arithmetic section 9 so as to be compared by the comparator in the arithmetic section 9. Thereafter, AND of the COMPBO signal (when compared result coincides, outputs 1, and when not coincide, outputs 0) and HWBO is obtained so as to be overwritten into HWBO.

There will be explained below the operation in the case where the ANDD=instruction is not executed with reference to FIG. 16. When the ANDD=instruction is stored in the B2R register 4 (period T5 in FIG. 16), as mentioned above, the ANDD=instruction is decoded as 0 wait instruction so as to be transmitted to the B3R register 5.

For period T7 the process is not executed, and the instruction codes are transmitted to the DEC2 register 5. Further, since the HWBO is defined as 0 for period T8, AND of the COMPBO signal and HWBO is not stored, and the last value of HWBO is overwritten on HWBO. Moreover, finally the stack pointer 18 is initialized so that the process is ended. In the case where double word data stored in D0 and D1 coincides with double word data stored in D2 and D3, the COMPBO signal is 1. However, when a comparison of sizes and non-coincidence are also used as the comparison condition, the similar operation is performed.

The circuit diagram shown in FIG. 17 will be explained. 2WAIT2 signal and NOWAIT2 signal are decode signals latched by the DEC2 register 16. At the stage that the these signals are stored in the B2R register 5, in the case of HWBO=1, the 2WAIT2 signal becomes 1, and in the case of HWBO=0, the NOWAIT2 signal becomes 1. Namely, when the execution condition is established, the data of the comparator 25 are stored in HWBO, and in the case where the execution condition is not established, the value of HWBO is overwritten.

In the ladder circuit diagram shown in FIG. 14(c), ORD= instruction shown by 63 is an instruction for storing OR of the compared result and HWBO into the conductive/non-conductive information storage section 7 unlikethe ANDD= instruction. In this case, in the case of HWBO=0, the arithmetic is executed, and in the case of HWBO=1, the arithmetic is not executed. As a result, similarly to the ANDD=instruction, the processing time can be shortened.

As mentioned above, in the instruction for storing the arithmetic result into the conductive/non-conductive storage section 7, before the comparison arithmetic is executed, a judgment is made as to execution/non-execution according to the execution condition of the instruction. In the case where the instruction is not executed, the comparison arithmetic is not executed and data of the conductive/non-conductive information storage section 7 are overwritten. As a result, the process is shortened, and the process at the time of non-execution can be shortened.

Figure 19:
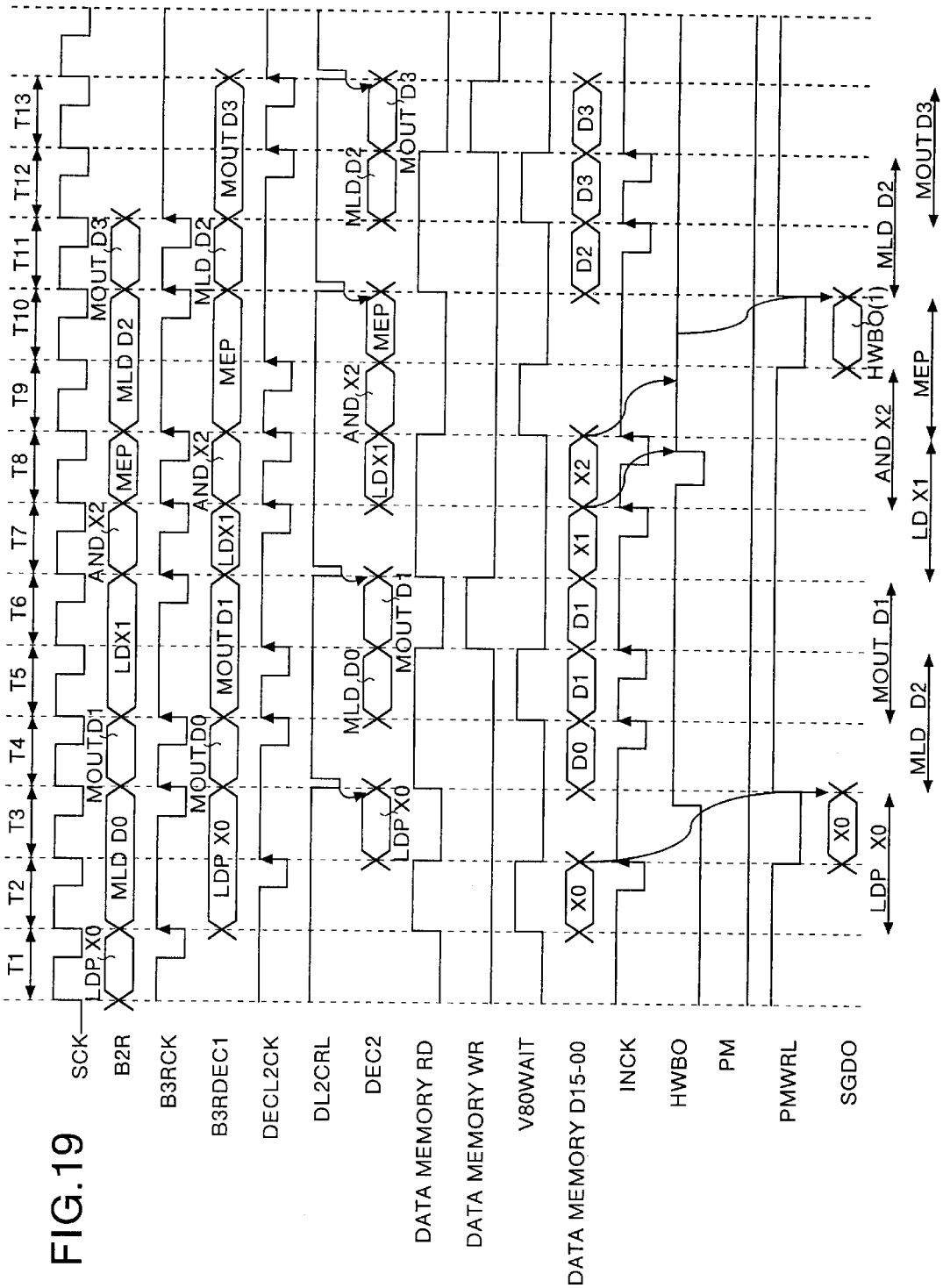
FIG. 19 is a timing chart showing an operation at the first scanning of the ladder circuit shown in FIG. 18(a)
Figure 20:
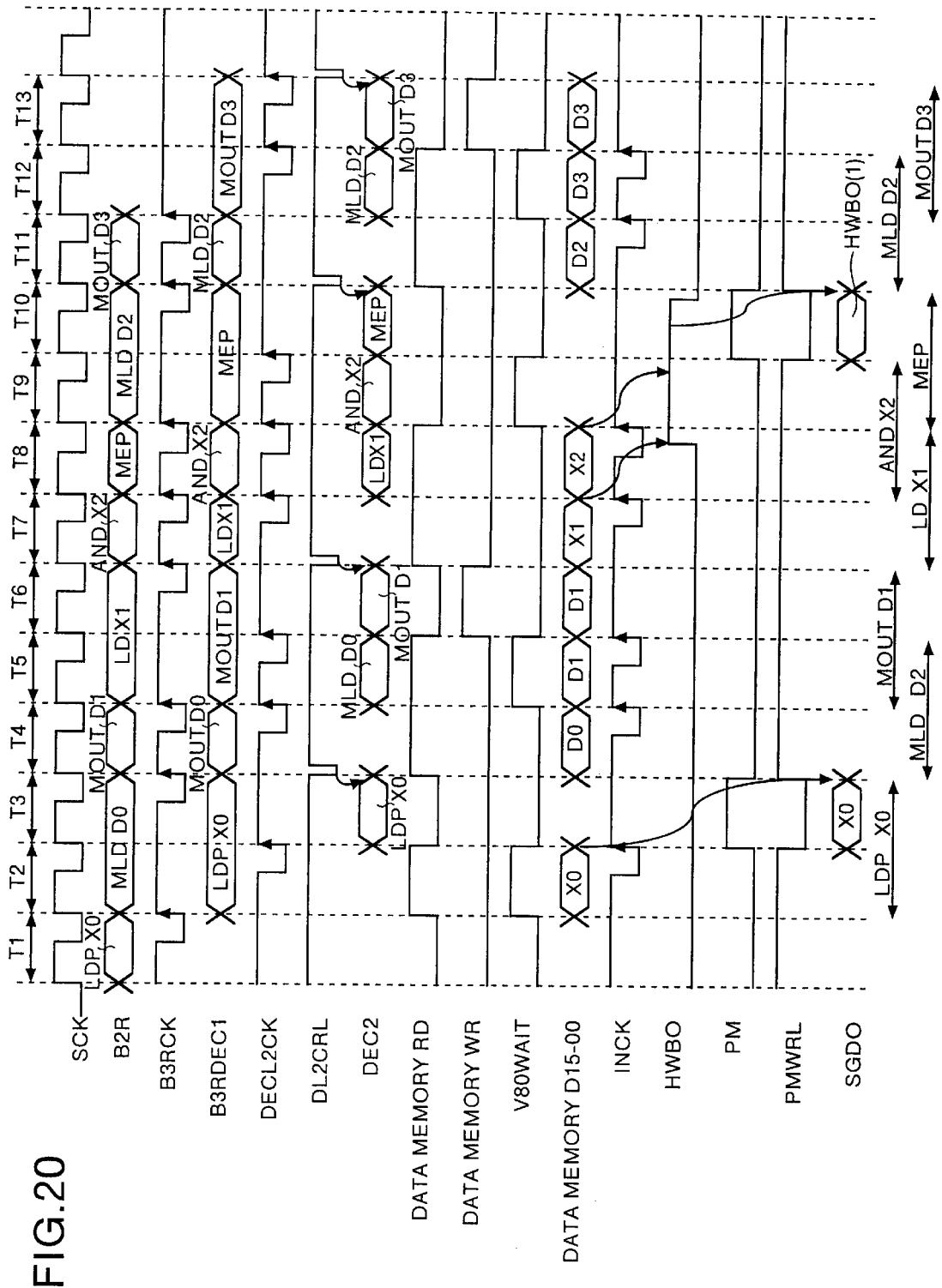
FIG. 20 is a timing chart showing an operation at and after the second scanning of the ladder circuit shown in FIG. 18(a)
Figure 21:
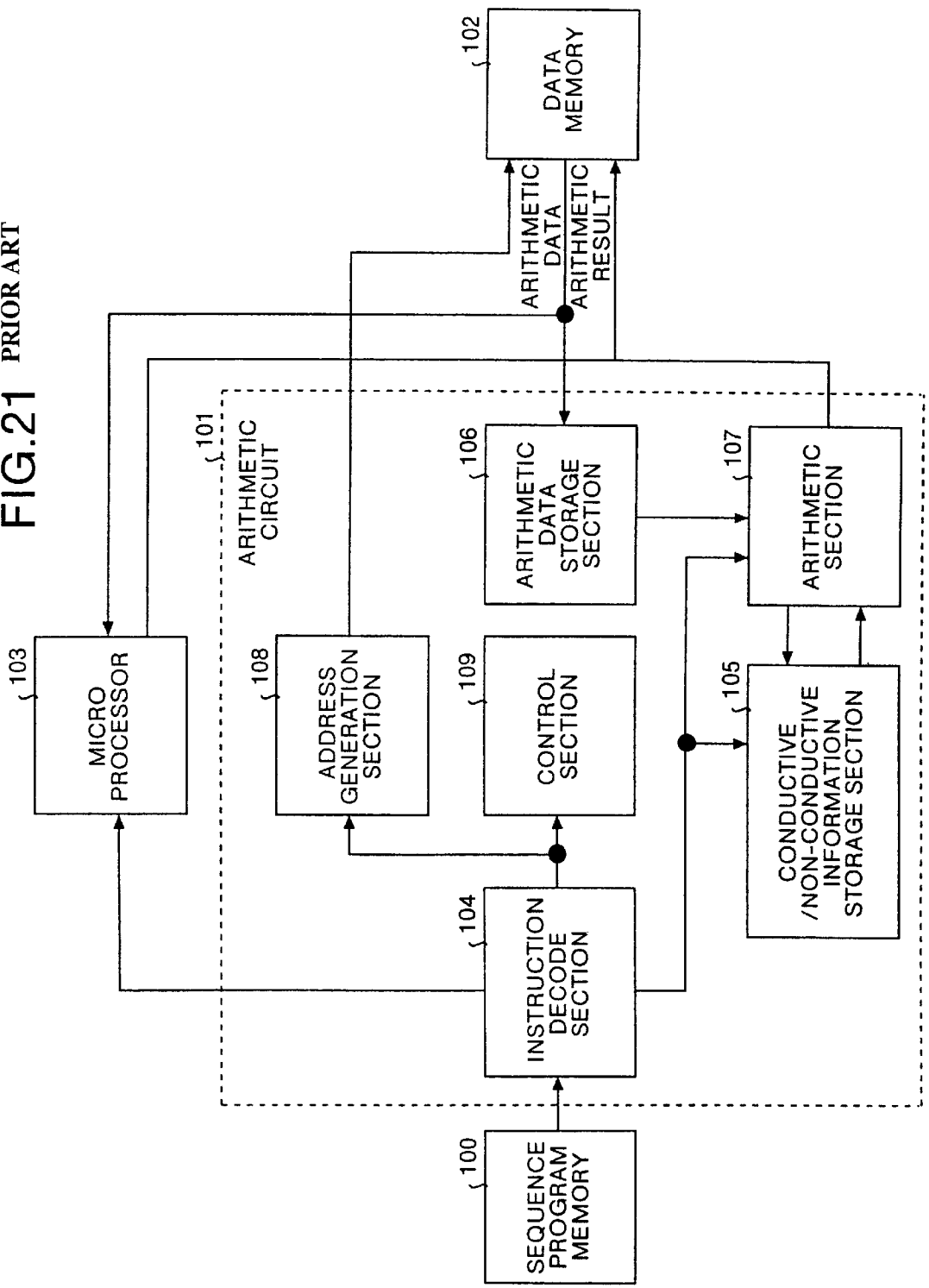
FIG. 21 is a block diagram showing a structure of a conventional programmable controller.
Figure 22:
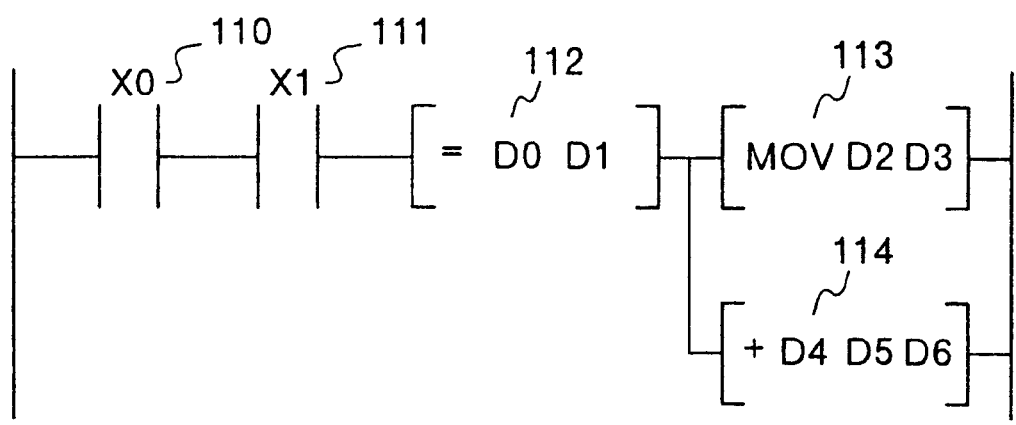
FIG. 22 is a ladder circuit diagram showing an operation of the conventional programmable controller.

FIGS. 18(a) and 18(b) show the ladder circuit of the sequence program and contents of the instruction codes (example 5). In FIG. 18(a), 70 is an instruction (symbol) for making the contact point conductive at scanning that the value of the bit device X0 is changed from 0→1. 71 is a transmission instruction (symbol). 72 is an LD instruction (symbol). 73 is an instruction (symbol) for making the contact point conductive in the case where AND of X2 and the arithmetic result of the LD instruction in the instruction 72 is 1. 74 is an instruction (symbol) for making the contact point conductive at scanning that the state of the contact point up to the instruction 73 is changed from 0→1. 75 is a transmission instruction (symbol). FIG. 19 is a timing chart showing the operations of the instructions 70 and 74 at the first scanning. FIG. 20 is a timing chart showing the operations of the instructions at and after the second scanning.

Operation of the LDP instruction 70 in FIG. 18 will be explained here with reference to FIGS. 19 and 20. In FIG. 19, when the instruction codes of the LDP instruction are stored in the B2R register 4, the LPD instruction is decoded as 1 wait instruction so as to be transmitted to the B3R register 5.

For period T2 reading to the data memory 3 is executed and the state of the bit device X0 is read into the input register 14, and the pipeline register operation is stopped by the V80WAIT signal. For period T3 AND of state of X0 and inverted PM is stored as conductive/non-conductive information into HWBO, and the state of the bit device X0 is stored in the execution flag bit.

There will be explained below the operation at and after the second scanning with reference to FIG. 20. For period T3 in FIG. 19 in the case where X0=0 is stored in SGDO, PM becomes at the second scanning, and this is the same as the state before the LDP instruction is executed at the first scanning.

There will be explained below the case where X0=1 is stored in SGDO for period T3 in FIG. 19. In this case, as shown in period T3 of FIG. 20, 1 is stored as the value of PM in the LDP instruction, AND of X0 and inverted PM becomes 0 regardless of the state of X0, and HWBO becomes 0 (contact point is non-conductive).

At this time, for period T3 in FIG. 20, when X0=1 is stored in the execution flag bit, the state at the third scanning is the same as the state before the LDP instruction is executed at the second scanning. Moreover, when X0=0 is stored in the execution flag bit, the state at the third scanning is the same as the state before the LDP instruction is executed at the first scanning.

There will be explained below the operation of the MEP instruction 74 in FIG. 18 with reference to FIGS. 19 and 20. In FIG. 19, when the instruction codes of the MPE instruction are stored in the B2R register 4, the MEP instruction is decoded as 1 wait instruction so as to be transmitted to the B3R register 5.

For period T9 the operation of the pipeline register is stopped by the V80WAIT signal. For period T10 the data of HWBO is saved in the register in the conductive/non-conductive information storage section 7, and AND of HWBO and inverted PM is stored as conductive/non-conductive information into HWBO. Further, the saved state of HWBO is stored in the execution flag bit.

There will be explained below the operation at and after the second scanning with reference to FIG. 20. For period T10 in FIG. 19 in the case where HWBO=0 is saved so as to be stored in SGDO, PM becomes 0 at the second scanning, and the state is the same as the state before the MEP instruction is executed at the first scanning.

There will be explained below the case where HWBO=0 is saved so as to be stored in SGDO for period T10 in FIG. 19. In this case, as shown in period T10 of FIG. 20, 1 is stored as the value of PM in the MEP instruction, and AND of HWBO and inverted PM becomes 0 regardless of the state of HWBO, and HWBO becomes 0 (contact point is non-conductive).

At this time, for period T10 in FIG. 20, when HWBO=1 is saved so as to be stored in the execution flag bit, the sate at the third scanning is the same as the state before the MEP instruction is executed at the second scanning. Moreover, when HWBO=0 is saved so as to be stored in the execution flag bit, the state at the third scanning is the same as the state before the MEP instruction is executed at the first scanning. Moreover, in the MEP instruction, as shown in period T10 of FIG. 19, since HWBO is updated by the arithmetic of the MEP instruction, the data before updating are temporarily saved in the register, and the saved data are written into the execution flag bit.

In addition, the LDP instruction and MEP instruction which are operated at rising was explained, but when AND of X0 and inverted PM is stored in HWBO of the LDP instruction, the LPD and MEP instructions become instructions which are executed at scanning that the bit device X trails from 1→0. Moreover, in the MEP instruction, when AND of HWBO and inverted PM is stored in HWBO, the MEP instruction becomes an instruction which is executed at scanning that the contact point trails from 1→0. Similarly, when AND of the state of X0 and inverted PM and HWBO is stored in HWBO, the instruction becomes the ANDP instruction which is shown in the instruction 76 of FIG. 18(c). When OR of AND of the state of X0 and inverted PM and HWBO is stored in HWBO, the instruction becomes the ORP instruction shown in the instruction 77 of FIG. 18(c).

As mentioned above, the logical arithmetic is executed by the bit device read from the data memory 3 and the execution flag bit, and the arithmetic result is written into the execution/non-execution information storage section 7. Further, the state of the bit device at the last scanning is written into the execution flag bit of the sequence program memory 1. As a result, the instruction for executing only scanning that the bit device is changed can be processed by the H/W arithmetic circuit with high speed, and the processing time can be sped up.

In addition, the logical arithmetic is executed by the state of the execution/non-execution information storage section 7 and the execution flag bit, and the arithmetic result is written into the execution/non-execution information storage section 7. Further, the state of the execution/non-execution information storage section 7 at the last scanning is written into the execution flag bit of the sequence program memory 1. The instruction for executing only scanning that the contact point is changed can be processed by the H/W circuit with high speed, and the processing time can be sped up.

INDUSTRIAL APPLICABILITY

The programmable controller of the present invention is useful for various machine tools and industrial machines which make sequence control.

What is claimed is:

1. A programmable controller comprising:

a sequence program memory for storing a sequence program;

a data memory for storing arithmetic data;

an instruction decode section for analyzing instruction codes of said sequence program memory;

a conductive/non-conductive information storage section for storing a state of a contact point of the last sequence program, wherein said instruction decode section judges execution/non-execution according to a state of the contact point of the last sequence program stored in said conductive/non-conductive information storage section under an execution condition of an instruction decoded by said instruction decode section;

an arithmetic data storage section for temporarily storing the arithmetic data read from said data memory;

a control section for controlling reading/writing for said data memory and controlling said arithmetic data storage section; and an arithmetic section composed of hardware for executing arithmetic according to contents of the instruction codes, said control section having a data memory control section which reads arithmetic data from said data memory or said sequence program memory when the execution condition is established and after arithmetic in said arithmetic section, provides control so as to write an arithmetic result into said data memory, and provides control so as not to read/write the arithmetic data between said data memory and said arithmetic section when the execution condition is not established, and does not execute arithmetic when the execution condition is not established so as to proceed to next instruction.

2. A programmable controller comprising:

a sequence program memory for storing a sequence program, which sequence program memory having a bit for storing existence/non-existence of an instruction at the last scanning;

a data memory for storing arithmetic data;

an instruction decode section for analyzing instruction codes of said sequence program memory;

a conductive/non-conductive information storage section for storing a state of a contact point of the last sequence program, wherein said instruction decode section judges execution/non-execution according to a state of the contact conductive/non-conductive information storage section and on/off state of the bit in said sequence program memory under an execution condition of an instruction decoded by said instruction decode section;

an arithmetic data storage section for temporarily storing the arithmetic data read from said data memory;

a control section for controlling reading/writing for said data memory and controlling said arithmetic data storage section; and an arithmetic section composed of hardware for executing arithmetic according to contents of the instruction codes, said control section having a data memory control section which reads arithmetic data from said data memory or said sequence program memory when the execution condition is established and after arithmetic in said arithmetic section, provides control so as to write an arithmetic result into said data memory, and provides control so as not to read/write the arithmetic data between said data memory and said arithmetic section when the execution condition is not established, and does not execute arithmetic when the execution condition is not established so as to proceed to next instruction.

3. The programmable controller according to claim 2, characterized in that data of said conductive/non-conductive information storage section are written into the bit in said program memory into which execution/non-execution of an instruction at the last scanning is stored.

4. The programmable controller according to claim 1 further comprising, an address holding unit for latching an address of said data memory to be accessed in said data memory; and an address generation control unit for incrementing an address latched by said address holding unit so as to generate an address for said data memory when said instruction decode section recognizes instruction codes for executing double word arithmetic, and the execution condition is established and high-order word data are read/written, wherein based on the operation of said address holding unit and said address generation control unit the double word data is read/write into said data memory.

5. The programmable controller according to claim 1, characterized in that:

said arithmetic section has a comparator, when the execution condition is established, after said data memory control section reads the arithmetic data from said data memory or said sequence program memory and said comparator in said arithmetic section execute comparison arithmetic, said data memory control section provides control so as to write the arithmetic result into said data memory, and when the execution condition is not established, said data memory control section provides control so as not to read/write the arithmetic data between said data memory and said arithmetic section, and when the execution condition is not established, said data memory control section does not execute the comparison arithmetic by means of said comparator of said arithmetic section so as to proceed to next instruction.

6. The programmable controller according to claim 1, characterized in that:

instruction codes, which are composed of a combination of an instruction for reading the arithmetic data from said data memory or an instruction for reading contents of said program memory and an instruction showing arithmetic, are stored in said program memory, said arithmetic data storage section has a data storage-use register for storing the arithmetic data read from said data memory and a stack pointer showing a register address in which the arithmetic data are stored, said control section has a stack pointer control section which stores the arithmetic data into said data storage-use register and increments said stack pointer when the instruction for reading the arithmetic data or the instruction for reading the contents of said program memory is executed, and decrements said stack pointer when the instruction showing arithmetic is executed so as to read the data from said data storage-use register, and initializes said stack pointer at the time of processing the instruction showing arithmetic when the execution condition is not established.

7. The programmable controller according to claim 1, characterized in that:

a bit for storing execution/non-execution of an instruction at the last scanning is provided in said program memory for storing the sequence program, logical arithmetic between on/off state of a bit read from said data memory and on/off state of the bit into which execution/non-execution of the instruction at the last scanning is stored is executed, and the arithmetic result is written into said conductive/non-conductive information storage section.

8. The programmable controller according to claim 7, characterized in that the on/off state of the bit read from said data memory is stored into the bit in said program memory into which execution/non-execution of the instruction at the last scanning.

9. The programmable controller according to claim 1, characterized in that:

a bit for storing execution/non-execution of an instruction at the last scanning is provided in said program memory into which the sequence program is stored, logic arithmetic between on/off state of the contact point of the last sequence program stored in said conductive/non-conductive information storage section and of an on/off state of a bit into which execution/non-execution of an instruction at the last scanning is stored is executed, and the arithmetic result is written into said conductive/non-conductive information storage section.

10. The programmable controller according to claim 9, characterized by comprising:

a register for saving data of said conductive/nonconductive information storage section, the data saved in said register is written into the bit in said program memory into which execution/non-execution of the instruction at the last scanning is stored.

* * * * *